US012618675B2

(12) United States Patent
Berkovich et al.

(10) Patent No.: US 12,618,675 B2
(45) Date of Patent: May 5, 2026

(54) METHOD AND SYSTEM FOR MAGNETIC-BASED COLLABORATIVE POSITIONING AMONG PORTABLE DEVICES

(71) Applicant: INVENSENSE, INC., San Jose, CA (US)

(72) Inventors: Gennadii Berkovich, Calgary (CA); Dmitry Churikov, Calgary (CA); Iurii Kotik, Calgary (CA); Vladimir Pentiukhov, Calgary (CA); Christopher Goodall, Calgary (CA)

( * ) Notice: Subject to any disclaimer, the term of this patent is extended or adjusted under 35 U.S.C. 154(b) by 129 days.

(21) Appl. No.: 17/512,301

(22) Filed: Oct. 27, 2021

(65) Prior Publication Data

US 2022/0136832 A1 May 5, 2022

Related U.S. Application Data

(60) Provisional application No. 63/108,210, filed on Oct. 30, 2020.

(51) Int. Cl.
*G01C 21/00* (2006.01)
*G01C 21/08* (2006.01)
(Continued)

(52) U.S. Cl.
CPC ........... *G01C 21/005* (2013.01); *G01C 21/08* (2013.01); *G01C 21/1654* (2020.08); *G01C 21/206* (2013.01)

(58) Field of Classification Search
CPC .. G01C 21/005; G01C 21/1654; G01C 21/08; G01C 21/206
See application file for complete search history.

(56) References Cited

U.S. PATENT DOCUMENTS

| | | | | |
|---|---|---|---|---|
| 6,292,758 | B1* | 9/2001 | Gilbert ................... | G01V 3/081 |
| | | | | 324/207.13 |
| 2012/0116677 | A1* | 5/2012 | Higgison .............. | G01S 5/0072 |
| | | | | 701/518 |

(Continued)

FOREIGN PATENT DOCUMENTS

| | | | | | |
|---|---|---|---|---|---|
| EP | 3869218 | * | 8/2021 | ............... | G01S 5/02 |
| EP | 3869218 | A1 * | 8/2021 | .......... | H04W 12/069 |

(Continued)

OTHER PUBLICATIONS

Daisuke Taniuchi, Xiaopeng Liu, Daisuke Nakai, and Takuya Maekawa, Spring Model Based Collaborative Indoor Position Estimation With Neighbor Mobile Devices, IEEE Journal of Selected Topics in Signal Processing, vol. 9, No. 2 (Year: 2015).*

(Continued)

*Primary Examiner* — Scott A Browne
*Assistant Examiner* — Terry C Buse

(57) ABSTRACT

Magnetic-based collaborative positioning of a portable device involves obtaining magnetic field measurements for the portable device, obtaining magnetic fingerprint map information, obtaining parameters of motion of the portable device, obtaining collaborative assistance data from at least one neighbor portable device and determining position of the portable device based on the obtained magnetic field measurements, the obtained magnetic map information, the obtained motion parameters and the obtained collaborative assistance data.

19 Claims, 10 Drawing Sheets

(51) Int. Cl.
G01C 21/16            (2006.01)
G01C 21/20            (2006.01)

(56)          References Cited

U.S. PATENT DOCUMENTS

| | | | | |
|---|---|---|---|---|
| 2013/0057260 | A1 | 3/2013 | Kim et al. | |
| 2013/0335273 | A1 | 12/2013 | Payam et al. | |
| 2015/0018018 | A1* | 1/2015 | Shen | G01C 21/005 |
| | | | | 455/457 |
| 2016/0116290 | A1* | 4/2016 | Haverinen | G01C 21/14 |
| | | | | 701/525 |
| 2018/0310127 | A1* | 10/2018 | Xia | H04W 24/10 |
| 2020/0103477 | A1* | 4/2020 | Berkovich | G01R 33/0035 |
| 2020/0233096 | A1* | 7/2020 | Hazlett | H04W 4/02 |
| 2021/0095967 | A1* | 4/2021 | Karon | H04W 4/021 |
| 2022/0342030 | A1* | 10/2022 | Yin | G01S 5/0289 |
| 2023/0014580 | A1* | 1/2023 | Zhu | G01C 21/3867 |
| 2023/0070440 | A1* | 3/2023 | Frish | G01C 21/206 |
| 2023/0076568 | A1* | 3/2023 | Tisseur | H04W 4/44 |
| 2023/0128964 | A1* | 4/2023 | Tisseur | G06N 20/00 |
| | | | | 701/468 |
| 2023/0224672 | A1* | 7/2023 | Bleckmann | H04W 4/029 |
| | | | | 455/456.1 |

FOREIGN PATENT DOCUMENTS

| | | |
|---|---|---|
| JP | A2013-054033 | 3/2013 |
| JP | A2018-136330 | 12/2013 |

OTHER PUBLICATIONS

Marzieh Jalal Abadi, Luca Luceri, Mahbub Hassan, Chun Tung Chou, and Monica Nicoli, A Cooperative Machine Learning Approach for Pedestrian Navigation in Indoor IoT, Sensors 2019, Published: Oct. 23, 2019 (Year: 2019).*

* cited by examiner

METHOD AND SYSTEM FOR MAGNETIC-BASED COLLABORATIVE POSITIONING AMONG PORTABLE DEVICES

CROSS-REFERENCE TO RELATED APPLICATIONS

This application claims priority from and benefit of U.S. Provisional Patent Application Ser. No. 63/108,210, filed Oct. 30, 2020, which is entitled "Magnetic-based collaborative positioning," is assigned to the assignee hereof, and is incorporated by reference in its entirety.

FIELD OF THE PRESENT DISCLOSURE

The present disclosure relates to positioning of people, vehicles and goods within indoor environments. More specifically, systems and methods are provided for magnetic-based techniques using portable devices.

BACKGROUND

A variety of technologies have been developed to help determine position information for moving platforms, such as autonomous or piloted ground or aerial vehicles. A pedestrian is also considered a moving platform. For example, the Global Navigation Satellite Systems (GNSS) comprises a group of satellites that transmit encoded signals and receivers on the ground, by means of trilateration techniques, can calculate their position using the travel time of the satellites' signals and information about the satellites' current location. GNSS is considered a reference-based technique and provides an absolute source of navigational information. The desirability of obtaining position information extends to indoor environments where pedestrians may traverse and multiple types of vehicles may be employed, including forklifts and other service machinery in a warehouse, automobiles and buses in underground parking structures, wheelchairs in a hospital, and portable robots or unmanned aerial vehicles (UAV)/drones that navigate within buildings. However, GNSS is typically unsatisfactory when use for indoor positioning due to the attenuation of satellite signals in the walls and roofs buildings, necessitating use of different technologies.

In the absence of GNSS signals in indoor environments, an Inertial Navigation System (INS) may be used by employing techniques such as dead reckoning to help determine position. INS is a self-contained and/or "non-reference based" technique that utilizes inertial sensors within the moving object and do not depend upon external sources of information that can become interrupted or blocked. Motion sensors are self-contained within the moving object and measure motion, such as through the use of gyroscopes to measure the object's rate of rotation/angle and accelerometers to measure the object's specific force (from which acceleration is obtained). Using initial estimates of position, velocity and orientation angles of the moving object as a starting point, the INS readings can subsequently be integrated over time and used to determine a navigation solution. Typically, measurements are integrated (mathematical integration which is a calculus operation) once for gyroscopes to yield orientation angles and twice for accelerometers to yield position of the moving object incorporating the orientation angles. Thus, sensor measurements will undergo a triple integration operation during the process of yielding position. Integrated navigation techniques usually integrate (i.e. combine) reference-based or absolute navigational information with self-contained or non-reference based navigation information. Integrated navigation techniques may employ state estimation techniques, such as a Kalman filter, an extended Kalman filter, a Gaussian sum filter, an unscented filter, a particle filter, or others, which have characteristics including a prediction phase and an update phase (which may also be termed a measurement update phase). A state estimation technique also uses a system model and measurement model(s) based on what measurements are used. The system model is used in the prediction phase, and the measurement model(s) is/are used in the update phase.

Due to the integration operations (the mathematical integration as in calculus), motion sensor-based techniques may fail to provide adequate performance by themselves, particularly over longer durations due to significant performance degradation from accumulating sensor drifts and bias. As such, positioning technologies relying solely on motion sensors may not satisfy all requirements for seamless indoor navigation applications. As a result, alternative positioning techniques that can provide strong coverage in areas where access to GNSS and other reference-based positioning is degraded or denied are desirable. One class of techniques is known as "fingerprinting," and relies on recording patterns of electromagnetic signals at known locations within an area for which position information may be desired. When a device subsequently measures a pattern of received signals that is correlated with a known location, that location may be used to determine the position of the device and/or to aid another positioning technique, such as through integration with the INS techniques noted above. A suitable example of signals that may be used for fingerprinting may be based on the communication signals for an IEEE 802.11 Wireless Local Area Network (WLAN), commonly referred to as "WiFi." However, many different electromagnetic signals are suitable for location determinations using fingerprinting, including other wireless communication signals such as Bluetooth™ and radiofrequency identification (RFID). Still further, environmental signals such as magnetic fields can also provide the necessary fingerprints and benefit from the techniques of this disclosure.

Notably, magnetic-based positioning relies on variations in the Earth magnetic field created by ferrous materials of buildings construction. Magnetic-based positioning is an attractive technology of indoor positioning because it is infrastructure-free and benefits from the long-term stability of magnetic fields within buildings. Provided a suitable magnetic fingerprint map of the indoor environment is at least partly available, which is obtained by collecting magnetometer readings at positions inside a building separated by some distance, and then estimating the magnetic field in those positions by processing the magnetometer readings, real-time magnetic-based positioning can then be realized indoors by comparing a magnetometer reading obtained with a portable device in an unknown position with the magnetic field values of known positions.

Despite its beneficial characteristics, certain drawbacks may affect magnetic-based indoor positioning. For example, when the magnetic fingerprint is not sufficiently unique, there may be ambiguities when determining position. As such, initialization in large, especially multi-floor, venues may take long time and not always result in a definitive position. Although the number of possibilities for a starting area can be reduced by using additional sources of information, such as by employing wireless communication beacons, this requires installation of additional infrastructure in the venue. Similarly, magnetic field ambiguity may also cause a delay in recovery when position determination of a portable device is lost, as may result from inertial sensors error or a dead reckoning. Further, certain environments within an indoor venue may have relatively low spatial variations of magnetic field and accuracy of magnetic-based positioning may degrade as the distinctiveness of the magnetic fingerprints is reduced under these conditions. By employing the techniques of this disclosure, each of these drawbacks can be addressed. As will be discussed in the following materials, assistance from neighboring portable devices may be used to collaboratively improve accuracy and reliability.

SUMMARY

As will be described in detail below, this disclosure includes a method for magnetic-based collaborative positioning of a portable device. The method may involve obtaining magnetic field measurements for the portable device, obtaining magnetic fingerprint map information, obtaining parameters of motion of the portable device, obtaining collaborative assistance data from at least one neighbor portable device and determining position of the portable device based on the obtained magnetic field measurements, the obtained magnetic fingerprint map information, the obtained motion parameters and the obtained collaborative assistance data.

This disclosure also includes a portable device for magnetic-based collaborative positioning, The portable device may have a magnetometer outputting magnetic field measurements for the portable device, a wireless communication module for obtaining magnetic fingerprint map information, motion sensors outputting parameters of motion of the portable device, a wireless communication module for obtaining collaborative assistance data from at least one neighbor portable device and at least one processor configured to receive the magnetic field measurements for the portable device, the magnetic fingerprint map information, the motion parameters of the portable device and the collaborative assistance data and determine position of the portable device based on the received magnetic field measurements, the received magnetic fingerprint map information, the received motion parameters and the received collaborative assistance data.

Further, this disclosure includes a system for magnetic-based collaborative positioning. The system may have a server for providing magnetic map information and a plurality of neighbor portable devices. Each portable device may have a magnetometer outputting magnetic field measurements for the portable device, a wireless communication module for obtaining magnetic fingerprint map information, motion sensors outputting parameters of motion of the portable device, a wireless communication module for obtaining collaborative assistance data from at least one neighbor portable device and at least one processor configured to receive the magnetic field measurements for the portable device, the magnetic fingerprint map information, the motion parameters of the portable device and the collaborative assistance data, and determine position of the portable device based on the received magnetic field measurements, the received magnetic fingerprint map information, the received motion parameters and the received collaborative assistance data.

DETAILED DESCRIPTION

Figure 1:
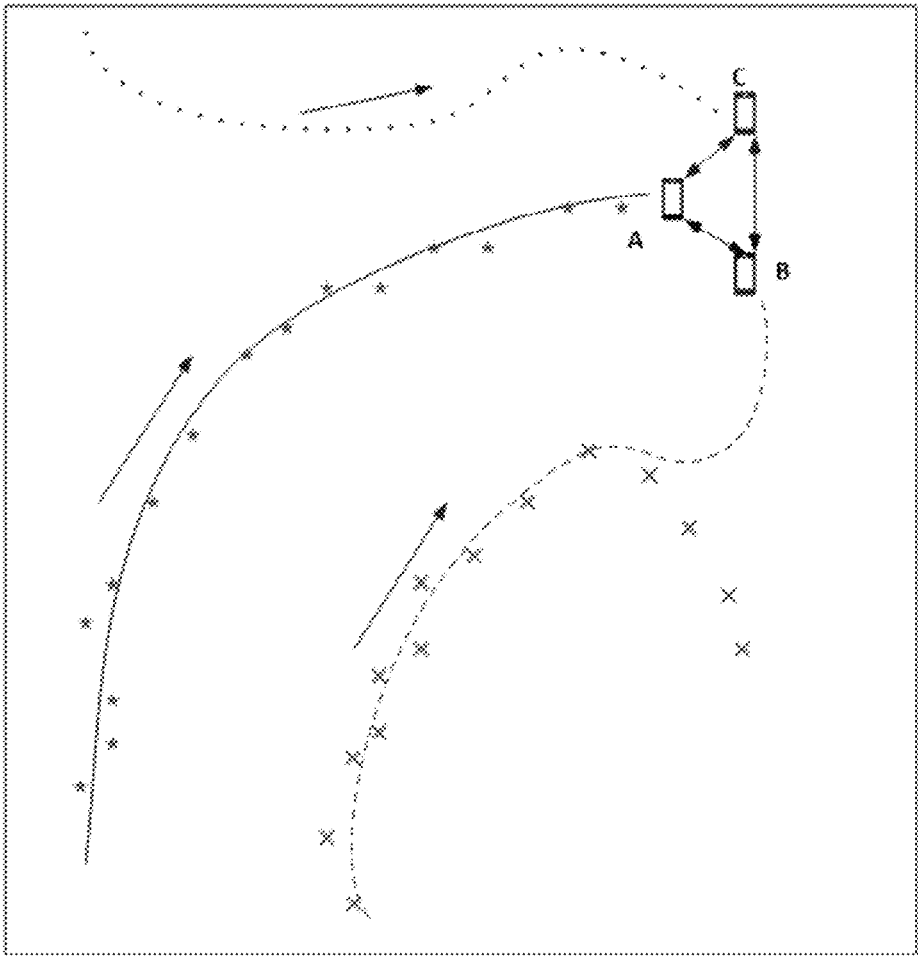
FIG. 1 is a schematic diagram of three neighbor portable devices undergoing different stages of position tracking according to an embodiment.

At the outset, it is to be understood that this disclosure is not limited to particularly exemplified materials, architectures, routines, methods, or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting. It is also to be understood that terms of art as used herein are to be given their accepted meanings known to one of ordinary skill in the art. Where appropriate, terms may also be given explicit definitions in the specification to convey their intended meaning.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

According to the techniques of this disclosure, systems and methods are provided for determining position within an indoor environment using magnetic-based positioning techniques in conjunction with collaborative assistance from other nearby portable devices. Magnetic-based positioning uses variations of Earth magnetic field created by ferrous materials of buildings construction. As noted above, magnetic-based positioning is an attractive technology for indoor positioning because it is infrastructure-free and due to long-term stability of magnetic field inside buildings. A first stage of magnetic-based positioning is a two-stage process is creating the magnetic fingerprint map that represents magnetic field of the venue. Creating such a map requires collecting magnetometer readings in all positions inside a building separated by some distance, and then estimating magnetic field in those positions by processing magnetometer readings. Once the map is created, magnetic-based positioning indoors may be realized by comparison of a magnetometer reading in unknown position with magnetic field values in known positions. The techniques of this disclosure focus on the usage of fingerprint maps to perform magnetic-based indoor positioning of pedestrians and vehicles with the assumption that a suitable magnetic fingerprint map of the venue is available. Examples of approaches for creating magnetic fingerprint maps are detailed in commonly-owned U.S. Pat. Nos. 10,341,982 and 11,035,915, both of which are incorporated by reference in the entirety.

Tracking the position of portable device according to this disclosure also involves the use of motion sensor data as may be obtained from one or more sensor assemblies representing motion of the portable device in space, including inertial sensors such as an accelerometer and a gyroscope and may be termed an inertial measurement unit (IMU), other motion sensors including a pressure sensor or others may be used in addition. Depending on the configuration, the sensors measure one or more axes of rotation and/or one or more axes of acceleration of the device. In one embodiment, this may include inertial rotational motion sensors or inertial linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation combines data to provide a six axis determination of motion or six degrees of freedom (6DOF). As desired, one or more sensors may be implemented using Micro Electro Mechanical System (MEMS), allowing integration into a single small package, but the techniques of this disclosure may be applied to any sensor design or implementation. Exemplary details regarding suitable sensor configurations may be found in commonly-owned U.S. Pat. Nos. 8,250,921 and 8,952,832, which are hereby incorporated by reference in their entirety and implementations are available from InvenSense, Inc. of Sunnyvale, Calif. Using dead-reckoning or other suitable techniques, a position determination for the portable device may be propagated forward in time, allowing the portable device to be tracked. However, particularly over longer durations, significant performance degradation from the accumulating sensor drifts and bias may occur.

The magnetic-based positioning techniques discussed above may be desirably used to correct for such errors in the motion sensor data. Tracking, or maintaining the known positions of the portable device over time, may be accomplished using magnetic-based positioning to correct relatively small errors in the motion sensor data. Desirably, tracking represents a continuous or substantially continuous operation such that any disruptions are quickly recovered. Notably, even if such errors exist, the local area surrounding the portable device is known which facilitates matching to the magnetic fingerprint map by reducing the search space. In other situations, the position determination may be so affected by motion sensor errors that this type of correction is not possible and leads to a loss of tracking. Consequently, a reacquisition procedure must then be performed and requires position determination in a wider area relative to the local area of tracking discussed above. In yet other situations, the initial position of the portable device is unknown and must be determined before tracking can commence. Likewise, the local area of the portable device must also be discovered during initialization so the process of tracking the portable device to correct motion sensor errors can start. This scenario requires the largest relative search space to determine global localization in the whole indoor venue as opposed to the local area used during tracking or the wider area used for reacquisition.

The above discussion may be viewed as relating three different cases of position determination. Position determination is considered a general approach that includes both global localization in the whole indoor venue in case of start and local position determination in case of tracking. Reacquisition stands between two these cases because position is determined in a wider area than in tracking case, ranging from an area smaller than the whole venue to an area equivalent to the whole venue depending on the difficulty of reacquisition. Collaboration according to the techniques of this disclosure can facilitate each of these position determination aspects.

According to the techniques of this disclosure, collaborative localization (or position determination aiding) involving multiple portable devices is based on the ability of the portable devices to discover each other, obtain relative observations, such as measurements of a relative distance or a relative direction between them, and exchange information between the devices. As will be appreciated, this collaborative approach allows reduces or eliminates the need for providing a dedicated infrastructure, such as wireless beacons, for positioning because neighbor portable devices can serve as portable landmarks for each other. Thus, the collaboration of neighboring portable devices need not require a dedicated infrastructure and, working together with magnetic positioning, can help to increase overall accuracy and reliability of positioning as will be demonstrated further.

As noted above, a drawback of magnetic-based indoor positioning is that the same value of magnetic field, the same fingerprint, can occur in different locations of the venue, causing ambiguity. Correspondingly, the start of position tracking in a big, especially multi-floor, venue can take long time and may not always successfully result in tracking the portable device. To decrease time of initialization, an initial position can be determined by using additional sources of information, e.g., signal of BLE beacons, but this requires installation additional infrastructure in the venue as discussed. Using multiple devices collaboratively facilitates tracking initialization and can decrease the requirement of additional infrastructure or eliminate it.

Similarly, recovering from loss of tracking is also negatively affected by ambiguity of magnetic field. Tracking can be lost because of an inertial sensors error, or a dead reckoning error, etc. Magnetic field ambiguity can also delay reacquisition, potentially as long as the period required for initialization. Again, collaboration involving multiple neighbor portable devices can ameliorate the reacquisition process.

Still further, it is known that the accuracy of magnetic-based position tracking can degrade when there are relatively low spatial variations of the magnetic field. An undesirably homogeneous magnetic field can occur in some areas of venues where less ferrous constructions were used. Fusion of magnetic-based positioning with collaborative positioning can help in this case to increase overall accuracy for the maintenance of position tracking.

To help illustrate these different scenarios, FIG. 1 schematically depicts the tracking of three portable devices A, B and C undergoing the trajectories as shown respectively by solid, dashed, and dotted lines. Devices A and B provide their successive locations, which are shown respectively by the stars and the crosses. In this example, positions of the device A are accurate whereas positions of portable device B are not, due to a loss of tracking. The portable device C has not started the navigation yet, initialization needs to occur so its localization must be determined with respect to the whole indoor environment. When such portable devices can discover each other, measure distance between them, and exchange the data between them, there is an opportunity to improve positioning compared with the case when the portable devices navigate independently. In the example of FIG. 1, collaborative data from device A can help device B to correct positioning and can help device C to initialize positioning faster. Further, after all devices are in tracking mode, collaboration between them can also help improve positioning accuracy, such as in situations of low spatial variations of the magnetic field, to help maintain position tracking.

Figure 2:
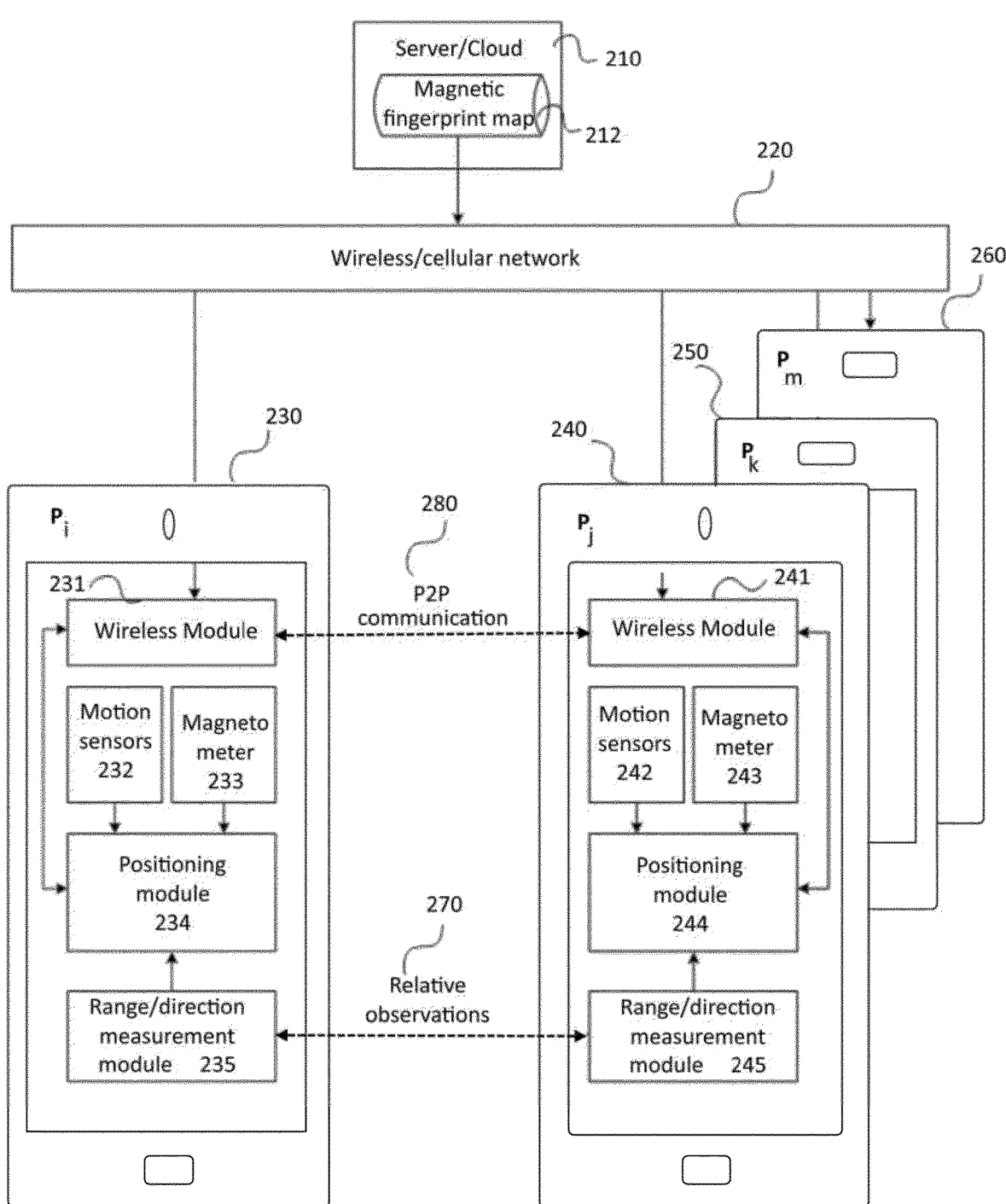
FIG. 2 is schematic diagram of a system for determining position using magnetic field measurements and collaborative assistance data according to an embodiment.

As will be described in further detail, the techniques of this disclosure can be implemented as a system for determining position of a portable device within an indoor environment using collaborative data from at least one neighboring portable device. One embodiment of such a system is schematically depicted in FIG. 2, showing a server or a cloud resource 210 that stores a magnetic fingerprint map 212 and a plurality of portable devices 230, 240, 250, 260. Although four portable devices are shown in FIG. 2, it should be appreciated that the disclosed techniques can be implemented using any number of neighbor portable devices.

Portable devices can communicate with server/cloud 210 through a wireless or cellular network 220. Any suitable protocol, including cellular-based and wireless local area network (WLAN) technologies such as Universal Terrestrial Radio Access (UTRA), Code Division Multiple Access (CDMA) networks, Global System for Portable Communications (GSM), the Institute of Electrical and Electronics Engineers (IEEE) 802.16 (WiMAX), Long Term Evolution (LTE), IEEE 802.11 (WiFi™) and others may be employed. Communication may be direct or indirect, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Portable devices include a set of modules to support magnetic-based collaborative positioning. For example, portable device 230 can include wireless module 231 to communicating with network 220. Portable device 230 also includes motion sensors 232, magnetometer 233, positioning module 234, and ranging/directing module 235. Motion sensors 232 may be one or more sensors or sensor assemblies that in some embodiments may be an integrated motion processing unit (MPU) or sensor processing unit (SPU) having processing and memory resources for storing and executing algorithms, routines or other instructions for processing data output by any of the sensors of the portable device. Motion sensors may include one or more sensors for measuring motion of portable device 230 in space as described below, including inertial sensors. Magnetometer 233 may be external or internal to any integrated processing unit. Generally, motion sensors 232 measure one or more axes of rotation and/or one or more axes of acceleration of the device. In one embodiment, motion sensors 232 may include rotational motion sensors or linear motion sensors. For example, the rotational motion sensors may be gyroscopes to measure angular velocity along one or more orthogonal axes and the linear motion sensors may be accelerometers to measure specific forces along one or more orthogonal axes. In one aspect, three gyroscopes and three accelerometers may be employed, such that a sensor fusion operation performed by a processing resources of device 230 to combine gyroscope and accelerometer data to provide a six-axis determination of motion.

Positioning module 234 utilizes any suitable processing and memory resources and the sensor information to execute stored instructions and derive a navigation solution comprising at least the position of portable device 230. The navigation solution may include any suitable information related to the position, motion and/or orientation of portable device 230. Although discussed primarily in the context of dead reckoning, which may be considered a self-contained strategy, positioning module 234 may employ a reference-based strategy, another self-contained strategy, or any combination of strategies to provide any desired degree of location awareness capabilities. For example, positioning module 234 may employ inertial navigation techniques utilizing sensor data from motion sensors 232 as obtained for a current sensor epoch to derive a navigation solution for that epoch. Optionally, positioning module 234 may also use a source of absolute navigation information for use with a reference-based strategy, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons or other similar methods when deriving a navigation solution. This is optional and not required in all embodiments.

Ranging/directing module 235 is used to determine position information relative to neighbor portable devices, such as portable devices 240, 250 and 260 as shown in FIG. 2, whereas wireless module 231 is used to exchange collaboration information with them. As used herein, the term "neighbor portable devices" means that locations of the portable devices are sufficiently close to each other that a device can detect other portable devices using appropriate technologies such as, for example, ultra wide band (UWB), Bluetooth (BT), Wi-Fi RTT (IEEE 802.11mc), ultrasound, or another suitable technology, can provide measurements using these technologies, e.g., measure relative distances and/or relative directions between them, and can exchange information between them using, for example, P2P communication like BT, Wi-Fi Aware™, Wi-Fi Direct®, etc.

The various modules of portable device 230 may be connected using any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired.

Similarly, portable device 240 is also shown to include wireless module 241, motion sensors 242, magnetometer 243, positioning module 244, and ranging/directing module 245. Other portable devices 250 and 260, which are shown as an example of plurality of devices, can include similar modules.

As noted above, the techniques of this disclosure relate to magnetic-based collaborative positioning of a portable device within an indoor environment or any other area with sufficient magnetic field variations. In a general case, there may be $K_t$ neighbor portable devices, where $K_t$ is number of the devices at time instant t. For illustration purposes, FIG. 2 shows 4 portable devices 230, 240, 250, 260, therefore in this example $K_t$=4, however there can be any positive number of neighbor portable devices. Particularly, $K_t$ can equal to one, which means that no other portable devices were discovered at time t. In dynamic situation, the number of neighbors $K_t$ can change over time.

One illustration of positioning for a portable device using collaborative data from other portable devices is as follows. The portable device for which positioning is being determined can be identified as portable device i or $P_i$, where i can be i=1, . . . , $K_t$. Therefore, the same description can be applied for each of $K_t$ portable devices. Other neighbor portable devices will be defined as devices j or $P_j$, j=1, . . . , $K_t$, i≠j. FIG. 2 gives an example of naming of portable devices, in which $P_i$ is portable device 230, $P_j$ is portable device 240, and portable devices 250 and 260, just as an illustration, are named as $P_k$ and $P_m$ respectively.

Using portable device 230 as an example, the components of the system interact as follows. Magnetic fingerprint map 212 is downloaded from server/cloud 210 through a wireless or cellular network 220 and wireless module 231 into positioning module 234. Motion data from motion sensors 232 and magnetic measurements from magnetometer 233 also come into positioning module 234. The output of the positioning module is estimation of a state of the portable device. The state can comprise coordinates of the portable device, heading, and other components that will be discussed further. Positioning module 234 uses motion data from motion sensors 232 to predict a state of the portable device and uses magnetic measurements from magnetometer 233 to correct the predicted state by comparison of the magnetometer measurements with the magnetic fingerprint map 212 that has been already downloaded into the positioning module 234.

In addition to the above-mentioned components for magnetic-based positioning, portable device 230 is equipped with ranging/directing module 235 that can provide relative observations 270, e.g., relative distances and/or relative directions between portable device 230 and, for example, neighbor portable device 240. The relative measurements can come from ranging/directing module 235 into positioning module 234. Additionally, portable devices 230 and 240 can exchange information between them, for example, by establishing P2P communication link 280, and portable device 230 can obtain estimation of state of neighbor portable device 240 via wireless module 231, providing it to positioning module 234. Operating in the same way, portable device 230 can obtain the similar data from other neighbor portable devices, e.g., portable devices 250 and 260. The relative measurements and estimation of state of neighbor portable devices are used in positioning module 234 as the collaborative assistance for magnetic-based positioning that will be further described in detail. Correspondingly, an estimated state of portable device 230 comes from positioning module 234 to wireless module 231 and can be sent to other portable devices.

The description of the system shown in FIG. 2 was given as an example for portable device $P_i$ (230). The same description can be given for each of $K_t$ neighbor portable device, for example, for portable device $P_j$ (240). There can be other embodiments of the system. For example, motion sensors 232 of portable device 230 and motion sensors 242 of portable device 240 are shown as internal components of the portable devices. However, in some variants of the system, for example, for vehicle positioning, motion sensors can be external sources of motion data. As used herein, vehicle refers to any automated, robotic or piloted terrestrial, maritime or aerial vehicles, and other similar devices capable of motion, whether used for transporting one or more passengers or cargo, or any other suitable purpose. As another variant, portable devices 230 and 240 in FIG. 2 communicate with each other directly using P2P communication link (decentralized approach). However, in some variants of system implementation, the portable devices can communicate indirectly through a server or a cloud (centralized approach). As one more variant, ranging/directing module 235 can additionally provide P2P communication instead of wireless module 231.

Accordingly, the techniques of this disclosure include a method for magnetic-based collaborative positioning of a portable device. The method may involve obtaining magnetic field measurements for the portable device, obtaining magnetic fingerprint map information, obtaining parameters of motion of the portable device, obtaining collaborative assistance data from at least one neighbor portable device and determining position of the portable device based on the obtained magnetic field measurements, the obtained magnetic fingerprint map information, the obtained motion parameters and the obtained collaborative assistance data.

In one aspect, determining position of the portable device may involve at least one of starting position tracking for the portable device during initialization, reacquiring position tracking for the portable device after loss of tracking and maintaining position tracking for the portable device.

In one aspect, the collaborative assistance data may be a state estimation of the at least one neighbor portable device. A state estimation of the portable device may also be sent to at least one neighbor portable device. The collaborative assistance data may also be at least one of a relative distance between the portable device and the at least one neighbor portable device and a relative direction between the portable device and the at least one neighbor portable device. The state estimation of the at least one neighbor portable device may be a mean position and an uncertainty and/or a set of particles with corresponding weights. A determination may be made whether a distribution of the state estimation of the at least one neighbor portable device is unimodal. Correspondingly, the state estimation of the at least one neighbor portable device may be a mean position and an uncertainty when a distribution of the state is unimodal and may be a set of particles with corresponding weights when a distribution of the state is multimodal.

In one aspect, collaborative assistance data may be obtained from a plurality of neighbor portable devices. A set of at least one neighbor portable devices may be preliminarily selected from the plurality of neighbor portable devices. The set of at least one neighbor portable devices may be based at least in part on any one or any combination of recency of data of the neighbor portable devices, line of sight to the neighbor portable devices, proximity of the neighbor portable devices, stationarity of the neighbor portable devices, uncertainty of position of the neighbor portable devices, uncertainty of relative measurements of the neighbor portable devices and dilution of precision of the neighbor portable devices.

In one aspect, the obtained collaborative assistance data may be propagated to a first instant, such that the position determined for the portable device is for the first instant.

In one aspect, the position for the portable device may be determined using a state estimation technique that comprises a Kalman filter for estimating a linear state for magnetometer bias and a particle filter for estimating a non-linear state for position of the portable device.

In one aspect, determining position of the portable device may involve starting position tracking for the portable device during initialization, wherein an initialization area is narrowed based at least in part on the collaborative assistance data.

In one aspect, determining position of the portable device may involve reacquiring position tracking for the portable device after loss of tracking, wherein the collaborative assistance data is applied during a prediction step of a particle filter and wherein a proportion of particles are sampled from a distribution of the collaborative assistance data and a remainder of particles are propagated according to a motion model.

In one aspect, determining position of the portable device may involve maintaining position tracking for the portable device, wherein the collaborative assistance data is applied during an update phase of a particle filter.

In one aspect, the determined magnetic-based collaborative position of the portable device may be combined with at least one or a combination of map-matching, radio frequency fingerprinting, proximity sensing and an optical technique.

This disclosure also includes a portable device for magnetic-based collaborative positioning, The portable device may have a magnetometer outputting magnetic field measurements for the portable device, a wireless communication module for obtaining magnetic fingerprint map information, motion sensors outputting parameters of motion of the portable device, a wireless communication module for obtaining collaborative assistance data from at least one neighbor portable device and at least one processor configured to receive the magnetic field measurements for the portable device, the magnetic fingerprint map information, the motion parameters of the portable device and the collaborative assistance data and determine position of the portable device based on the received magnetic field measurements, the received magnetic fingerprint map information, the received motion parameters and the received collaborative assistance data.

In one aspect, the at least one processor may be configured to determine position of the portable device by at least one of start position tracking for the portable device during initialization, reacquire position tracking for the portable device after loss of tracking and maintain position tracking for the portable device.

In one aspect, the portable device further comprises means for determining relative information about the at least one neighbor portable device, wherein the relative information may be at least one of relative distance and relative direction.

This disclosure also includes a system for magnetic-based collaborative positioning. The system may have a server for providing magnetic fingerprint map information and a plurality of neighbor portable devices. Each portable device may have a magnetometer outputting magnetic field measurements for the portable device, a wireless communication module for obtaining magnetic fingerprint map information, motion sensors outputting parameters of motion of the portable device, a wireless communication module for obtaining collaborative assistance data from at least one neighbor portable device and at least one processor configured to receive the magnetic field measurements for the portable device, the magnetic fingerprint map information, the motion parameters of the portable device and the collaborative assistance data, and determine position of the portable device based on the magnetic field measurements, the received magnetic fingerprint map information, the received motion parameters, and the received collaborative assistance data.

In one aspect, at least one of the plurality of neighbor portable devices may receive collaborative assistance from another of the plurality of neighbor devices by communicating through the server.

In one aspect, at least one of the plurality of neighbor portable devices may receive collaborative assistance data directly from at least one other of the plurality of neighbor devices.

In one aspect, the at least one of the plurality of neighbor portable devices further comprises means for determining relative information about the at least one other of the plurality of neighbor devices, wherein the relative information comprises at least one of relative distance and relative direction.

EXAMPLES

The examples set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

As described above, the techniques of the disclosure involve methods and systems method of magnetic-based collaborative indoor positioning of a plurality of portable devices. The main operations involve: a) obtaining, by each of the portable devices, data for magnetic-based positioning including magnetic fingerprint map information, magnetic field measurements and parameters of motion of the portable device; b) obtaining, by each of the portable devices, the collaborative data from neighbor portable devices that include a state estimation of each neighbor portable devices and relative observations of neighbor portable devices; and c) determining, by each of the portable devices, position of the portable device based on the obtained data for magnetic based positioning and using the obtained collaborative data from neighbor portable devices as assistance for at least one of i) start (initialization) of positioning; ii) reacquisition (recovering) of positioning from loss of tracking; and iii) maintain tracking position of the portable device. Each aspect is discussed in the following materials.

A. Obtaining the Data for Magnetic Based Positioning

As noted, the data for magnetic-based positioning may include magnetic fingerprint map information, magnetometer measurements, and parameters of motion of the portable device.

A magnetic fingerprint map provides mapping between magnetic field and positions. For example, a magnetic fingerprint map can be considered as a database every record of which can contain a 3D vector estimate of magnetic field at a certain position. Besides the 3D vector, the record can also contain other data, e.g., uncertainty of 3D magnetic estimate and possibly other parameters. Positions can be defined in a certain coordinate frame further named as a fingerprint frame, e.g., local coordinate frame of the venue, global coordinate frame or another appropriate frame. Thus, a fingerprint map comprises plurality of positions associated with parameters of magnetic field in said positions. Creating a magnetic fingerprint map requires collecting magnetometer readings in all positions inside a building separated by a given distance and then estimating magnetic field in those positions by processing magnetometer readings. Another approach is crowdsourcing-based collection of the data. The techniques of this disclosure assume that magnetic fingerprint maps are already created and stored on a server. The map can be downloaded via a communication link to the memory of the portable device as a whole or by parts (or tiles) to reduce traffic and storage requirements.

Magnetic field measurements are taken an unknown position to compare them with magnetic field values in known positions and thus determine the position of the portable device. As discussed above, the portable devices, e.g., smartphones, may be equipped with a 3D magnetometer that provides 3D vectors of measurements of magnetic field.

Parameters of motion of the portable device are used by a suitable algorithm, such as dead reckoning, to propagate a state of the portable device. In a general case, the state of a rigid body is described by its 3D Cartesian coordinates and 3 orientation angles (roll, pitch, and heading). Instead of Cartesian frame, any other coordinate frame can be used, e.g., the global frame. As an example, the sources of motion parameters, such as motion sensors 232, can include inertial sensors, accelerometers and gyroscopes as discussed above and a pressure sensor (barometer). Additional sources of sensor information can include odometry, e.g., wheel sensors and/or velocity sensors, e.g., Doppler sensor in the case of vehicles. In many cases, portable devices, e.g., smartphones, may be equipped with inertial sensors like accelerometers, gyroscopes, and barometer that can provide parameters of motion.

In other cases, motion parameters can be obtained from the sources that are external with respect to the portable device. For example, in the case of vehicles, there are standard ways of obtaining their information, for example, through CAN bus or OBD-2. Another example is a flight control module of UAV that in many cases is equipped with inertial sensors and a barometer and can determine roll and pitch angles and provide information about altitude information. For applications involving ground vehicle navigation, 2D position and heading may be sufficient because ground vehicles moving indoors don't experience large dynamic movements and, in many cases, roll and pitch can be omitted. For pedestrian applications, roll and pitch angles are useful because a smartphone may have random orientation. For aerial vehicle applications like UAV (drones), generally all 3 coordinates including height (or altitude) and all 3 orientation angles are required.

B. Obtaining the Collaborative Data from Neighbor Portable Devices

1. Coordinate System

Figure 3:
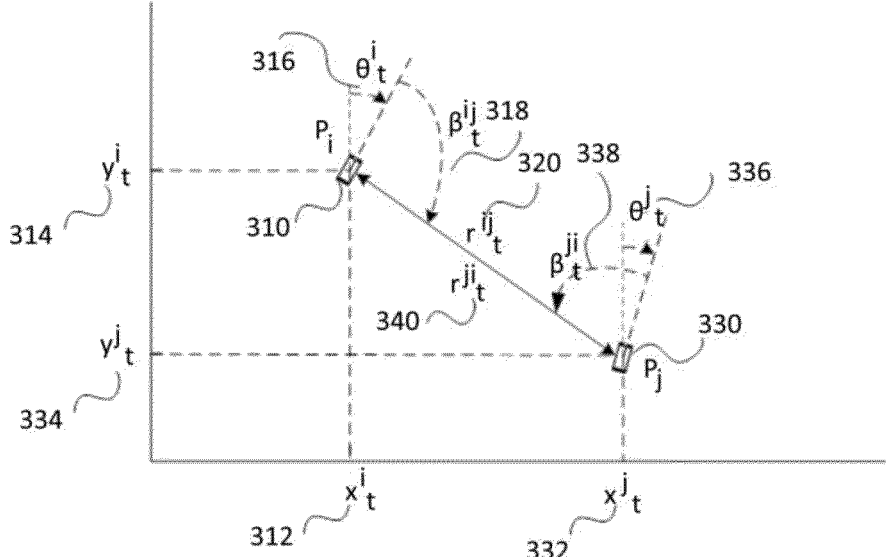
FIG. 3 is a schematic diagram of a coordinate system for expressing relative observation information about neighbor portable devices according to an embodiment.

A coordinate system is used to characterize the relationships between neighbor portable devices. Typically, the state of rigid devices is described by their 3D Cartesian coordinates and 3 orientation angles (roll, pitch, and heading) as noted. Instead of Cartesian frame, any other coordinate frame can be used, e.g., the global frame. In some cases of a 2D navigation, it may be necessary to know 2D position and heading, however, other orientation angles like roll and pitch can also be required, for example for smartphone-based pedestrian navigation. To help illustrate, FIG. 3 schematically depicts a suitable coordinate system of this disclosure for an example of the 2D navigation case. Two portable devices $P_i$ (310) and $P_j$ (330) are shown in Cartesian frame, with North assigned to the vertical axis, however, any other direction of the axis is also possible. The position of the portable device $P_i$ is characterized by coordinates $$x_t^i$$

(312) and $$y_t^i$$

(314), and its orientation by heading $$\theta_t^i$$

1 (316). The heading angle is usually measured clockwise from the North direction. Two other orientation angles, roll and pitch, are not shown in this figure, but their use will be explained further. Similarly, the position of the portable device $P_j$ is described by coordinates $$x_t^j$$

(332) and $$y_t^j$$

(334), and its orientation by heading $$\theta_t^j$$

(336). A relative distance between the portable device i and the portable device j is depicted as $$r_t^{ij}$$

(320) in FIG. 3. A relative distance between the portable device j and the portable device i is depicted as $$r_t^{ji}$$

(340), which equals to the value of $$r_t^{ij}$$

(320). Relative distance $$r_t^{ij}$$

between portable devices i and j can be derived from coordinates of the portable devices as indicated by Equation (1):

$$r_t^{ij} = \sqrt{\left(x_t^j - x_t^i\right)^2 + \left(y_t^j - y_t^i\right)^2} \tag{1}$$

Relative direction angles are also indicated in FIG. 3, with the relative bearing being an angle usually measured from the heading of the portable device to the direction of the neighbor portable device. In the figure, the relative bearing between portable devices i and j is angle $$\beta_t^{ij}$$

(318), whereas the relative bearing between portable devices j and i is angle $$\beta_t^{ji}$$

(338). Relative bearing $$\beta_t^{ij}$$

(318) can be derived from coordinates of the portable devices according to Equation (2), where inverse tangent function atan 2 calculates the unique value of arc tangent considering the sign of both arguments to determine the quadrant:

$$\beta_t^{ij} = \operatorname{atan2}\left(y_t^j - y_t^i, x_t^j - x_t^i\right) - \theta_t^i \tag{2}$$

Relative bearing $$\beta_t^{ji}$$

(338) can be derived similarly.

2. State Estimation of Neighbor Portable Devices

Obtaining state estimation for neighbor portable devices can involve the following operations. The positioning modules 234 and 244 of portable devices 230 and 240 (FIG. 2) are configured to execute instructions for estimating their respective states. In this 2D example, the state may at least be described by a pair of Cartesian coordinates $$s_t^j = \left(x_t^j \, y_t^j\right)^T,$$

and heading $$\theta_t^j,$$

where j is the number of a portable device. Instead of Cartesian frame, any other frame can be used to define the position, for example, a global frame. In 3D case, position can additionally contain height of the portable device. Another possible option is positioning in multi-floor venues where the 2D position can be supplemented by a floor number. The estimation of the state can be also supplemented by a timestamp $$T_s^j,$$

which is time of state determination by some positioning software, and with an ID of the portable device.

The full description of the state of the portable device j is represented by the posterior distribution of the state. In some cases, the state posterior distribution is known and can be represented by several parameters. For example, when using the Kalman filter or extended Kalman filter for state estimation, the posterior distribution of the state is considered as the normal distribution that can be characterized by a mean value of the state and a covariance. The covariance matrix $$\Sigma_t^j,$$

which characterizes uncertainty of the position, can be 2-by-2 or 3-by-3 respectively for 2D and 3D navigation cases. An uncertainty of the heading can be characterized by its standard deviation $$\sigma_{\theta t}^j.$$

The normal distribution is unimodal and in many practical cases cannot accurately represent the posterior distribution of the state. A more general approach, not relying on any specific distribution, uses a particle filter for positioning of the portable devices, in which representation of the state posterior distribution is provided by a finite set of particles with corresponding weights. Such approach allows approximation of an arbitrary posterior distribution of the state more accurately by a set of particles with corresponding weights rather than just with a few parameters of the normal distribution, but its drawback is a considerable amount of data, which must be sent to the neighbor portable devices, thereby requiring a wider bandwidth of the communication channel between the neighbor portable devices.

The state posterior distribution can change in time and can have a unimodal shape at some time instances and can be multimodal at other instances. Our solution supports use of both approaches for the state estimation: by a mean value of the state with its uncertainty and by a set of particles with corresponding states. Both representations can be combined as will be demonstrated further.

3. Relative Observations of Neighbor Portable Devices

Relative observations are also obtained from neighbor portable devices. The portable devices may be equipped, for example, such modules (units) as UWB, Wi-Fi RTT, Bluetooth, ultrasound sensors, and others. Using such modules, the portable devices can measure relative distances or/and relative angles between them. As will be demonstrated further, different types of relative observations can be used for magnetic-based collaborative positioning. There can be several variants of relative observations of neighbor portable devices.

The relative distance between portable devices may be measured using a process known as ranging. Dependent on the specific hardware available to the portable devices, means for ranging can be based on propagation time between devices using Time of Arrival (ToA), Time Difference of Arrival (TDoA), or Round-Trip Time of Flight (RTToF) techniques in cases of UWB, Wi-Fi RTT (IEEE 802.11mc), and ultrasound, or based on Receive Signal Strength (RSS) in the case of Bluetooth. An example of the relative distance between two portable devices i and j is shown as $$r_t^{ij}$$

(320) in FIG. 3. The measured relative distance can be accompanied by its uncertainty, for example, a standard deviation $$\sigma_{dt}^{ij}$$

and a timestamp $$T_d^{ij}$$

that is the time of taking the measurement.

If portable devices do not support one or another ranging technology mentioned above, a less accurate estimate of relative distance can be imputed based on the ability to form a P2P connection between them, which inherently limits the possible distance. This can be considered as a special case when the relative distance between the portable devices is limited by some maximum distance $d_{max}$. Maximum distance $d_{max}$ is usually known from a specification for a communication module. As an example, Bluetooth module of a typical smartphone scans for another Bluetooth devices and can find them at some distance that for many smartphones does not exceed 10-15 m.

Relative direction is another observation that may be made between neighbor portable devices. In some cases, dependent on means it is equipped with, a portable device can determine a relative direction to a neighbor portable device. An example of such an angle, in case of 2D navigation, is a relative bearing that is an angle measured from the heading of the portable device to the direction of the neighbor portable device. The angle can be determined by using Angle of Arrival and Angle of Departure (AoA/AoD) techniques, for example, in cases of ultrasound or UWB. Another example is BLE 5.1 standard supporting AoA/AoD. Examples of relative bearings between portable devices i and j are shown in FIG. 3 as $$\beta_t^{ij}$$

(318) and $$\beta_t^{ji}$$

(338). Likewise, the measured relative direction can be accompanied by its uncertainty, for example, a standard deviation $$\sigma_{bt}^{ij}$$

and a timestamp $$T_b^{ij}$$

that is the time of taking the measurement. Relative measurements like a relative distance and/or a relative direction can be supplemented with the device ID.

4. Exchange of Collaborative Data Between Portable Devices

Under the techniques of this disclosure, the neighbor portable devices inform each other about their state estimate and potentially other data or information by exchanging collaborative data. In one embodiment, information is exchanged directly between portable devices (decentralized approach), for example, using Bluetooth, Wi-Fi Aware™, Wi-Fi Direct®, or other peer-to-peer (P2P) communication methods. Alternatively or in addition, information is exchanged indirectly (centralized approach), for example, by communicating through a wireless network. Both implementations can be used for collaborative data exchange, but the latter can have a bigger delay of data delivery. Exchange of information between portable devices allows them to obtain the collaborative assistance data to use the data for determining the position of the portable device.

There can be several variants of information sent from one device to another. A first embodiment relates to the information that the portable device j can send to the portable device i. First of all, the data includes state estimate of portable device j. In pedestrian applications, the data can, for example, comprise a 2D position $$s_t^j = \left(x_t^j \ \ y_t^j\right)^T$$

with a floor number $$f_t^j$$

(or a 3D position), a position uncertainty, for example, covariance matrix $$\Sigma_t^j,$$

a timestamp $$T_s^j.$$

. Then, the data can comprise a heading $$\theta_t^j,$$

a relative distance $$r_t^{ji},$$

and a bearing $$\beta_t^{ji}$$

(if available), and a timestamp of relative measurements $$T_d^j.$$

An ID of the portable device can be also sent. For embodiments using a particle filter for positioning of the portable devices, a representation of the entire state posterior distribution can be sent from one device to another as a finite set of particles with corresponding weights, instead of just a position and its uncertainty. This approach can be more accurate for representation of a state of the portable device, but its drawback is a considerable amount of data that should be sending that may require a bigger bandwidth of the communication channel. Both approaches can be combined as will be demonstrated further.

Relative measurements, such as the relative distance $$r_t^{ji}$$

and/or the relative bearing $$\beta_t^{ji}$$

taking by the portable device j can also be sent. Additionally, the data that the portable device j sends to the portable device i can include motion information. For example, it may be information about whether the portable device j is stationary or not. In another example involving vehicles, portable robots, or UAV, the exchange of data can comprise a velocity vector (or a velocity module and a velocity heading) and possibly other motion parameters.

Figure 4:
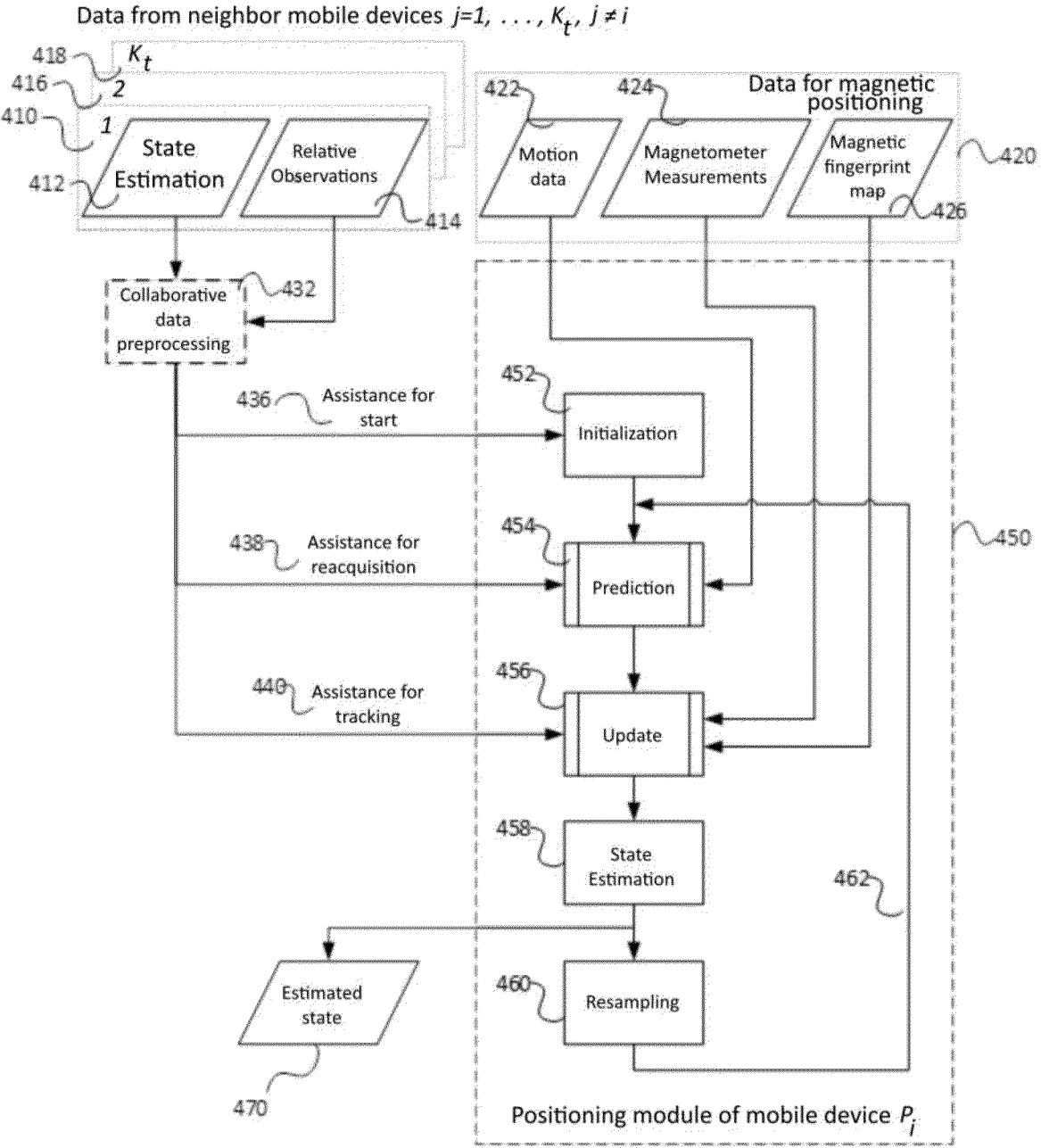
FIG. 4 is a schematic diagram of a particle filter implementation for determining position using magnetic field measurements and collaborative assistance data according to an embodiment.

C. Using Data Obtained from Neighbor Portable Devices as an Assistance for Magnetic-Based Collaborative Positioning 1. Particle Filter Embodiment In one embodiment, collaborative assistance for magnetic-based positioning may be used in a particle filter. Magnetic-based positioning of the portable device may be improved based at least in part on the collaborative data from neighbor portable devices as demonstrated for portable device i as shown in FIG. 4. The positioning module 450 of portable device i (which may have equivalent functionality as positioning module 234 of portable device 230 in FIG. 2), receives two sets of the data. The first set 410 comprises the collaborative data from a neighbor portable device 1 such as state estimation 412 of neighbor portable device and relative observations 414. Modules 416 and 418 show similar data from other neighbor portable devices j=1, . . . , $K_r$, j≠i. For example, module 416 holds the data for portable device 2 whereas module 418 does the same for portable device $K_r$. The second set 420 comprises the data for magnetic-based positioning, including magnetometer measurements 424, a magnetic fingerprint map 426, and motion data 422.

The output data 470 is the estimated state of portable device i, which can be, for example, the position of the portable device and the position uncertainty. The state, as was discussed above, can be also represented by its posterior distribution, which can be approximated by a set of particles with corresponding weights. The estimated state of portable device i can be sent to other portable devices as shown in FIG. 2 to use as collaborative assistance of positioning in these devices. The estimated state can be also used in portable device i to show a user its position, or to support location-based services, or for another purpose.

Collaborative magnetic positioning is discussed in the context of using a particle filter as an example of a module for magnetic-based positioning 450. A particle filter (PF) is a state estimation technique that is based on realization of the Bayes filter using sequential Monte-Carlo approach. The particle filter idea is based on representation of the state posterior PDF by a finite set of random samples, or particles, with corresponding weights. The PF 450 comprises following submodules: initialization 452, prediction 454, update 456, state estimation 458, and resampling 460. The initialization step 452 is executed once, whereas other steps are executed repeatedly, and the iteration loops from 460 to 454 that is shown by line 462.

In a 2D case, the state vector comprises planar coordinates and a heading $$z_t = (x_t \ y_t \ \theta_t)^T.$$

In this case, each of $N_t$ particles comprises similar components $$z_t^n = (x_t^n, \ y_t^n, \ \theta_t^n), \ n = 1, \ldots, N,$$

US 12,618,675 B2

23

N is a number of particles, t is a time index. Each particle is assigned with a weight $$w_t^n$$

depending upon a probability density value of these coordinates so that the set of the particles represents a posterior PDF of the state vector $z_t$. In a 3D case, the particle can additionally include a height $$h_t^n$$

or a floor number $$f_t^n.$$

The initialization module 452 samples particles with equal weights according to an initial state distribution. The prediction module 454 propagates coordinates of the particles according to the motion model and using motion data 422 of the portable device. The update module 456 updates particle weights using a likelihood function for the measurement model to correct propagation errors caused by motion data errors. The likelihood function is the probability of observing the measurement given the state of a particle and is calculated using magnetometer measurements 424 and magnetic fingerprint map 426. Particle weights are also normalized in the update module 456 so that their sum equals one.

The collaborative data from several neighbor portable devices can be preprocessed in optional module 432. Collaborative data 410-418 from neighbor portable devices are used as assistance data for start (436), reacquisition (438), and tracking (440) respectively in initialization (452), prediction (454), and update (456) modules of the particle filter 450 that will be described in further detail.

An output 2D position of a portable device can be estimated in module 458, for example, as weighted average as indicated by Equation (3), where $$s_t^n = (x_t^n\ y_t^n)^T:$$

$$\bar{s}_t = \sum_{n=1}^{N} w_t^n s_t^n \tag{3}$$

Covariance of the position that represents position uncertainty can be estimated according to Equation (4):

$$\sum_t = \sum_{n=1}^{N} w_t^n (s_t^n - \bar{s}_t)(s_t^n - \bar{s}_t)^T \tag{4}$$

Weights of particles are resampled in the resampling module 460 to prevent particles from degradation. Suitable resampling techniques are known in the art and is usually provided upon availability of some criterion about particle weights.

24

2. Optional Preprocessing

The optional collaborative data preprocessing in module 432 can be used in some embodiments of implementation to help improve data from neighbor portable devices. The collaborative data preprocessing may be helpful because collaborative data obtained from portable devices can be less reliable than, for example, data from stationary nodes like BLE beacons or Wi-Fi access points.

One technique involves preliminary selection of neighbor portable devices for collaboration, with the desired result of choosing devices most suitable for collaborative assistance from plurality of neighbor portable devices. For example, the following criteria can be used, alone or in any combination, to select more reliable neighbor portable devices as a source of collaborative assistance for magnetic positioning:

a) Smaller time intervals $$(t - T_s^j)$$

and $$(t - T_d^j),$$

i.e., the most recent data, which contribute to decreasing data propagation error.

b) Clear line-of-sight between the portable devices that in many cases is an important condition of achieving accurate relative measurements; clear line-of-sight can be provided, for example, by selecting portable devices with smaller relative distances $$r_t^{ji}$$

between them, i.e., using the closest portable devices, that contributes to increasing probability of unobstructed line-of-sight between the portable devices, by obtaining a map of the venue, e.g., an occupancy grid map, and checking if there is an obstacle marked in the map between coordinates of the portable devices, and selecting the portable devices without obstacles between them, and/or by estimating received signal level to check whether an obstacle exists between the two portable devices by comparison of expected signal level, e.g., RSSI, for the measured relative distance with the estimated one under the expectation that obstacles typically decrease the received signal level.

c) Stationary portable devices, in which case the data extrapolation and propagation detailed below may not be necessary.

d) Portable devices with smaller position uncertainties, i.e., with more accurate state estimation: for comparison of uncertainties, we can, for example, use a maximum eigenvalue of covariance $$\sum_t^j,$$

or a mean value of all eigenvalues.

e) Smaller uncertainties $$\sigma_{dt}^{ji}$$

of relative distances or/and $$\sigma_{bt}^{ji}$$

of relative bearings that like in the previous point contribute to more accurate position estimation.

f) Portable devices selected by a criterion of a lower delusion of precision (DOP) value. Like in GNSS navigation, lower DOP characterizes better geometry of neighbor portable devices for positioning. Therefore, selection of several neighbor portable devices featuring smallest DOP from a plurality of the devices can help to increase positioning accuracy.

Another preprocessing operation that may be performed involves the propagation or prediction of collaborative data to accommodate asynchronous information. Notably, data about neighbor portable devices can have different time stamps and, in some situations, positions of neighbor portable devices can be propagated to the current time, t. Different methods known from the art can be used for the prediction. For example, if motion parameters of neighbor portable devices are available, the state estimation of j-th neighbor portable device can be propagated for time $$\left(t - T_s^j\right)$$

based on a motion model for the specific motion platform. Relative measurements like distances and/or relative directions between portable devices can be also propagated for time interval $$\left(t - T_d^j\right)$$

if parameters of relative motion between them are available. In case of static portable devices, there is no need for the state estimation propagation.

Aging of position uncertainty of neighbor portable devices caused by data transmission latency can be accounted for time interval $$\left(t - T_s^j\right)$$

by using uncertainty propagation technique like, for example, covariance propagation of Kalman filter. In case of a static neighbor portable device, there is no need for its position uncertainty propagation. The uncertainty of the relative measurements can be propagated similarly for time interval $$\left(t - T_d^j\right)$$

to account aging of the relative measurements caused by the latency of data transmission. If both portable devices are static, there is no need for propagation of relative measurements uncertainty.

3. Use of Collaborative Data as Assistance for Initialization

The start serves for initial determination of a local area around the true position of the portable device so that the particle filter can start its iterative process of motion data errors correction. Collaborative data 436 assist initialization 452 of the particle filter. In initialization stage of the particle filter of the portable device $P_i$, the particles $$z_t^n,$$

are sampled with equal weights $$w_t^n = \frac{1}{N}$$

according to an initial state distribution $$p_0(z_t),$$

i.e., $$z_t^n \propto p_0(z_t),$$

n=1, . . . , N. In many cases of indoor positioning in GNSS denial environment, there is no information about the initial state distribution $p_0$, and the only possible way is to sample the particles uniformly distributed over the entire venue. This leads to two consequences: firstly, a large number N of particles may be needed to cover the entire venue space representing an increased computational burden to process all the particles, and, secondly, more time may be required for converging from initialization to tracking especially in large multi-floor buildings.

Figure 5A:
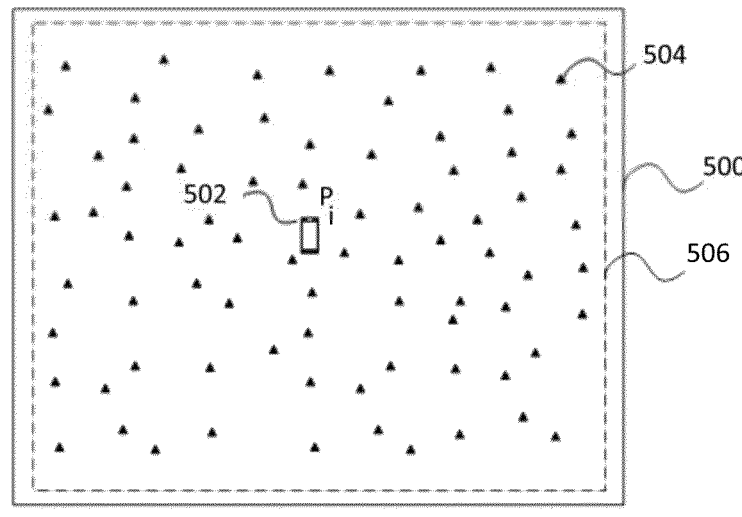
FIGS. 5*a* and 5*b* are schematic diagrams comparing starting position tracking without (FIG. 5*a*) and with (FIG. 5*b*) collaborative assistance data according to an embodiment.
Figure 5B:
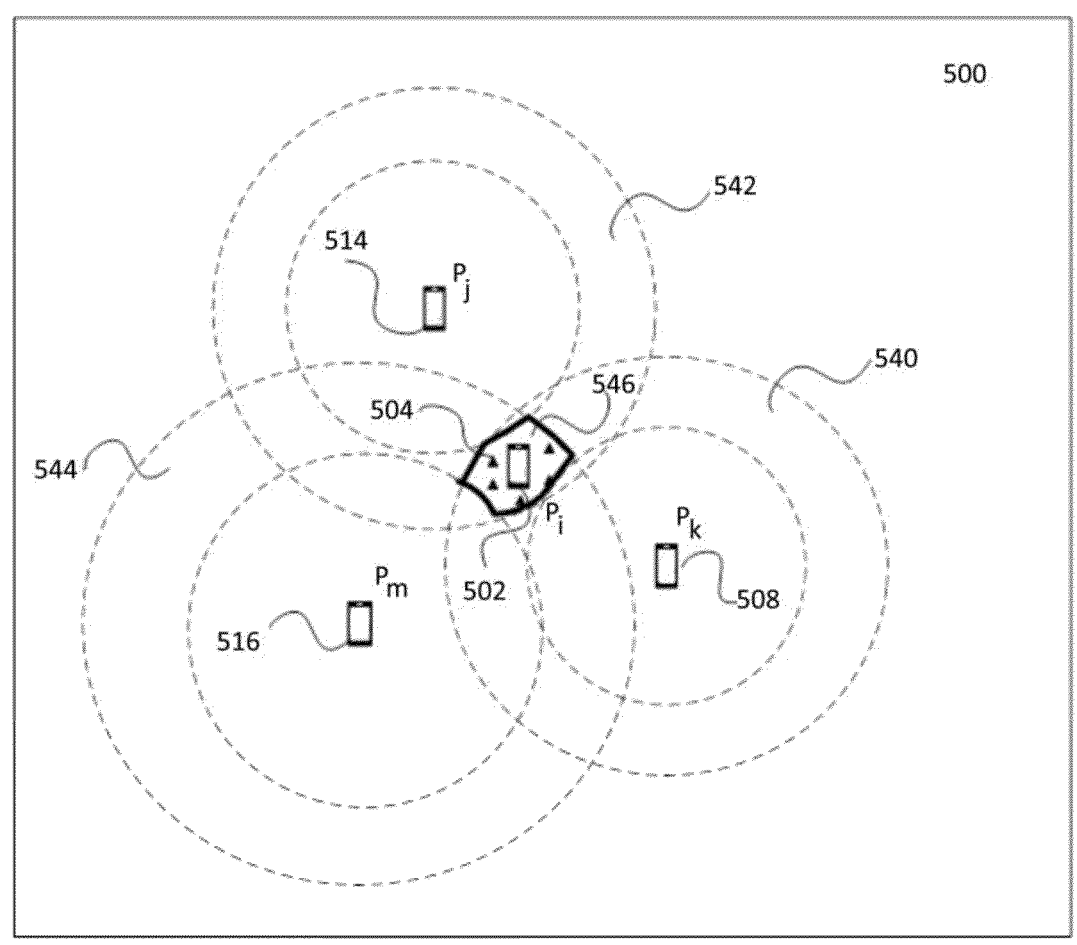

The following discussion demonstrates how assistance of the collaborative data from neighbor portable devices can be used for reducing the area of initialization, and, consequently, the number of particles and time of initialization needed. It is assumed that initial heading information is unavailable and therefore an initial heading $$\theta_t^n,$$

n=1, . . . , N, uniformly distributed from 0 to $2\pi$ is sampled, however, any other suitable initial heading distribution can also be used. A goal is the determination of an initial state distribution of position coordinates using collaborative data for initialization of magnetic-based positioning, thereby narrowing an initialization area so that significantly fewer particles can be used to cover the initialization area as schematically depicted in FIG. 5, which compares exemplary initialization areas with and without using the collaborative data. In the top view of FIG. 5*a*, an example of the initialization area 506 is depicted, shown by the rectangle with dashed boarders, when no collaborative data is available. To determine the unknown position of the portable device $P_i$ (502), the whole venue 500 must be covered with a relatively large number of particles 504 as shown by black triangles. In contrast, the bottom view FIG. 5*b* shows a zoomed in detail of a portion of the whole venue to illustrate initialization of positioning of portable device $P_i$ (502) using collaborative data from 3 neighbor portable devices $P_k$(508), $P_j$ (514), and $P_m$ (516). The collaborative data 436 in 2D case can include planar coordinates $$\vec{s}_t^{\,l} = \left( x_t^l \ \ y_t^l \right)^T,$$

covariance $$\sum{}_t^l,$$

timestamp $$T_s^l,$$

and relative distances $$d_t^{li}$$

measured between the portable device $P_i$ and other neighbor devices with corresponding uncertainties $$\sigma_{dt}^{li}$$

taken at time $$T_d^l.$$

This example can be extended to a 3D application by additionally employing a floor number $$f_t^l$$

or height $$h_t^l.$$

Index l relates to the neighbor portable devices $P_k$ (508), $P_j$ (514), and $P_m$ (516), i.e., l=j, k, m. As noted above, coordinates $$\vec{s}_t^{\,l}$$

and covariance $$\sum{}_t^l$$

can be propagated from the time positions $$T_s^l$$

were determined to the current time t. Similarly, relative distances $$d_t^{li}$$

and corresponding uncertainties $$\sigma_{dt}^{li}$$

can be propagated from the time measurement $$T_d^l$$

was taken to the current time t, l=j, k, m.

In particular, FIG. FIG. 5*b* illustrates initialization for the case of covariance of position of neighbor portable device $$\sum{}_t^l = \left( \sigma_{st}^l \right)^2 I_2$$

where $$\sigma_{st}^l$$

is a standard deviation of each component of position vector $$\vec{s}_t^{\,l},$$

l=j, k, m, and $I_2$ is a 2-by-2 identity matrix. In this case, the initialization area 546 is an intersection of three rings, i.e., the area that belongs to all three rings, respectively ring 540 centered in the position of portable device $P_k$ (508), ring 542 centered in the position of portable device $P_j$ (514), and ring 544 centered in the position of portable device $P_m$ (516). The radii of the rings are the relative distances measured between the portable device $P_i$ and other neighbor devices, correspondingly $$d_t^{ki}$$

for ring 540, $$d_t^{ji}$$

for ring 542, and $$d_t^{mi}$$

for ring 544. The width of every ring is proportional to the combined uncertainties of relative distances measured between neighbor portable devices $P_k$ (508), $P_j$ (514), and $P_m$ (516) and portable device $P_i$ (502) with position uncertainties of neighbor portable devices $P_k$ (508), $P_j$ (514), and $P_m$ (516) that can be illustrated by the formula $$\sqrt{\left(\sigma_{dt}^{li}\right)^2 + \left(\sigma_{st}^{l}\right)^2},$$

l=j, k, m. With the often-used coefficient of proportionality 3, location of portable device $P_i$ (502) will be covered by rings 540, 542, and 544 with a probability of more than 0.95. Intersection of these 3 rings identifies initialization area 546 shown in FIG. 5*b* by the thick black line. As can be seen, significantly fewer particles 504 (the black triangles) are necessary for initialization in this case compared with initialization in the whole venue 500 shown in FIG. 5*a*.

This approach can be further generalized to using the data from more than 3 neighbor portable devices. Notably, even one neighbor portable device may be useful for initialization of positioning of portable device $P_i$ (502). As an illustrative example, portable device $P_j$(514) may be the only neighbor device in the vicinity of portable device $P_i$ (502). In this case, the initialization area coincides with ring 542 around portable device 514. Despite more particles being necessary to cover the area 542 compared with area 546 determined by 3 neighbor portable devices, the area 542 is still considerably smaller than the whole venue 506 of FIG. 5*a*.

Relative measurements useful in the techniques of this disclosure may include not only the relative distance between neighbor portable devices but also relative bearings $$\beta_t^{li}$$

with corresponding uncertainties $$\sigma_{bt}^{li},$$

l=j, k, m. In this case, the initialization area is an intersection of sectors of the rings of the previous case, i.e., a part of the ring limited by some range of angles. The center of the sectors is defined by the relative bearings and the angular size of the sectors depends on the uncertainty of the relative bearings.

Computing the intersection area of several geometric objects is a problem in computational geometry. Several methods of solving the problem known from publications were applied in computer-aided design, computer graphics, different variants of trilateration technique, and in other applications. Software libraries known to one of ordinary skill in the art may be used to compute the intersection area and, therefore, can be used for the determination of the initialization area described above. Algorithms of multivariate pseudo-random number sampling are known in the art and can be used for particle sampling from initialization area 546. For example, algorithms such as Metropolis-Hastings algorithm, the Gibbs sampler, slice sampling, and other methods can be used for this purpose. A simplified approach can also be applied if the initialization area 546 can be approximated by a simpler geometrical shape such as, for example, a circle, a rectangle, or other primitive shapes. Sampling from the approximated area using simpler shapes may require reduced usage of processing resources.

Another approach can be also used for determination of the initialization area. For example, such approach can be based on minimization of a cost (or an error) function. For a case of using both relative distances and relative directions between neighbor portable devices, the cost function can be as indicated by Equation (5), in which $$x_t^i, y_t^i$$

are coordinates of portable device i, $$r_t^{ji}$$

is relative distance between portable devices j and i derived from coordinates of the portable devices according to Equation (1), $$d_t^{ji}$$

is measured relative distance between portable devices j and i, $$b_t^{ji}$$

is a measured bearing between portable devices j and i, $$\beta_t^{ji}$$

is a relative bearing derived from coordinates of the portable devices similar to Equation (2), $q_j$ and $p_j$ are weight coefficients depending on uncertainty of data for neighbor portable device j:

$$C(x_t^i, y_t^i) = \sum_{\substack{j=1 \\ j \neq i}}^{K_t} q_j \left(d_t^{ji} - r_t^{ji}\right)^2 + \sum_{\substack{j=1 \\ j \neq i}}^{K_t} p_j \cdot \left(d_t^{ji}\right)^2 \left(b_t^{ji} - \beta_t^{ji}\right)^2 \tag{5}$$

Weights $q_j$ can be inversely proportional to the combined uncertainty of the position of portable device j and the relative distance between portable devices j and i, for example $$\left((\sigma_{dt}^{ji})^2 + (\sigma_{st}^{j})^2\right)^{-1},$$

whereas weights $p_j$ can be inversely proportional to the combined uncertainty of the position of portable device j and the relative bearing between portable devices j and i, for example $$\left((d_t^{ji} \cdot \sigma_{bt}^{ji})^2 + (\sigma_{st}^{j})^2\right)^{-1}.$$

At that, the weights $q_j$ and $p_j$, j=1, . . . , $K_t$, j≠i, are jointly normalized, so that their sum equals 1. Coordinates $$x_{t0}^i, y_{t0}^i$$

of the center of the initialization area for portable device i are estimated by minimization of the cost function according to Equation (5) as indicated by Equation (6):

$$\left(x_{t0}^i, y_{t0}^i\right) = \underset{x_t^i, y_t^i}{\arg \min}\, C\!\left(x_t^i, y_t^i\right) \tag{6}$$

Different approaches known from the art can be applied to solve the minimization problem according to Equation (6), for example, the gradient descent or other algorithms.

Coordinates $$x_{t0}^i, y_{t0}^i$$

define a center of the initialization area where portable device 502 is most likely located. The size and the shape of the area is defined by the covariance $\Sigma_{i0}$ of the determined coordinates. The covariance depends on uncertainties $\Sigma_j$ of position of portable device j and on uncertainty of relative measurements between portable devices j and i, j=1, . . . , $K_t$, j≠i. Covariance $\Sigma_{i0}$ can be determined using one or another method of uncertainty propagation. It can be shown that the covariance $\Sigma_{i0}$ of the position of portable device i can be as indicated by Equation (7), in which $H_1$ is the matrix containing the second order partial and mixed derivatives of the cost function according to Equation (5) evaluated at $$x_{t0}^i, y_{t0}^i$$

with respect to the coordinates of portable device j and relative distance and bearing, $Q_j$ is a covariance matrix of position of portable device j and relative distance and bearing between portable devices j and i:

$$\Sigma_{i0} = \sum_{\substack{j=1 \\ j \neq i}}^{K_t} H_j Q_j H_j^T \tag{7}$$

Therefore, instead of area 546 we can use a simpler area centering at $$x_{t0}^i, y_{t0}^i$$

and having elliptical shape, which is described by covariance matrix $\Sigma_{i0}$ according to Equation (7). As was mentioned above, sampling particles for this case requires fewer computing resources.

Figure 6A:
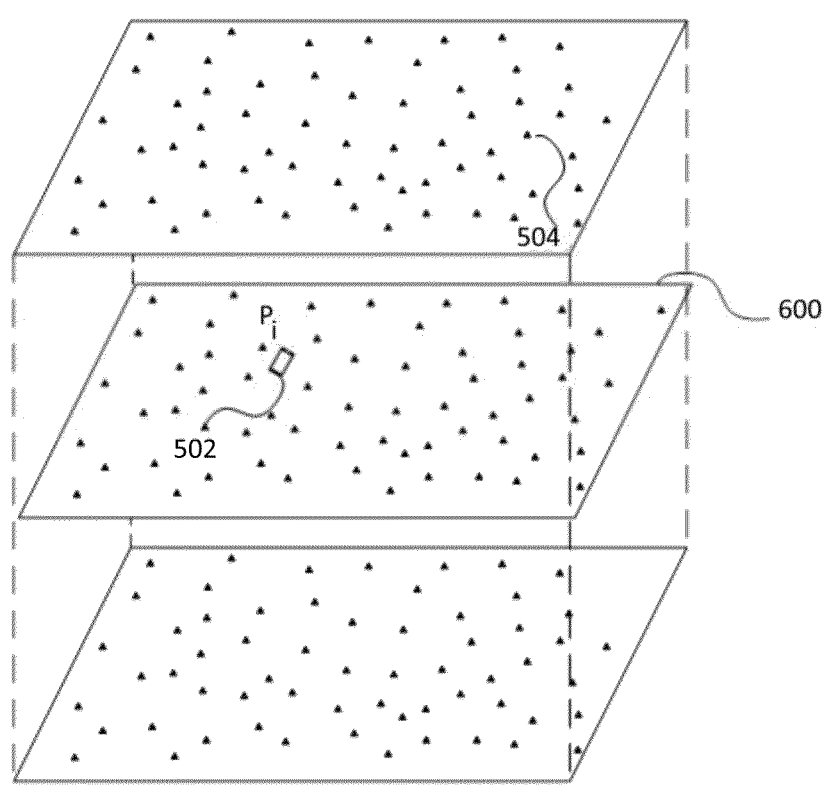
FIGS. 6*a* and 6*b* are schematic diagrams comparing starting position tracking without (FIG. 6*a*) and with (FIG. 6*b*) collaborative assistance data in a multi-floor venue according to an embodiment.

As an additional example, initialization in a case of 3D positioning may involve particles that additionally comprise a height or a floor number, and while sampling particles in initialization stage, it is desirable to cover the uncertainty of these components. To help illustrate these concepts, FIG. 6 schematically depicts an embodiment for determining a 3D position within a multi-floor indoor venue. As shown in the top view of FIG. 6a, initialization of the unknown position of portable device $P_i$ (502) must cover all floors (three floors in this example) of the whole venue 600 with a relatively large number of particles 504 again indicated by black triangles. As will be appreciated, this situation presents further difficulties as compared to the example of FIG. 5a because more time and more computing power will be required to converge from initialization to tracking given the significant uncertainty.

Figure 6B:
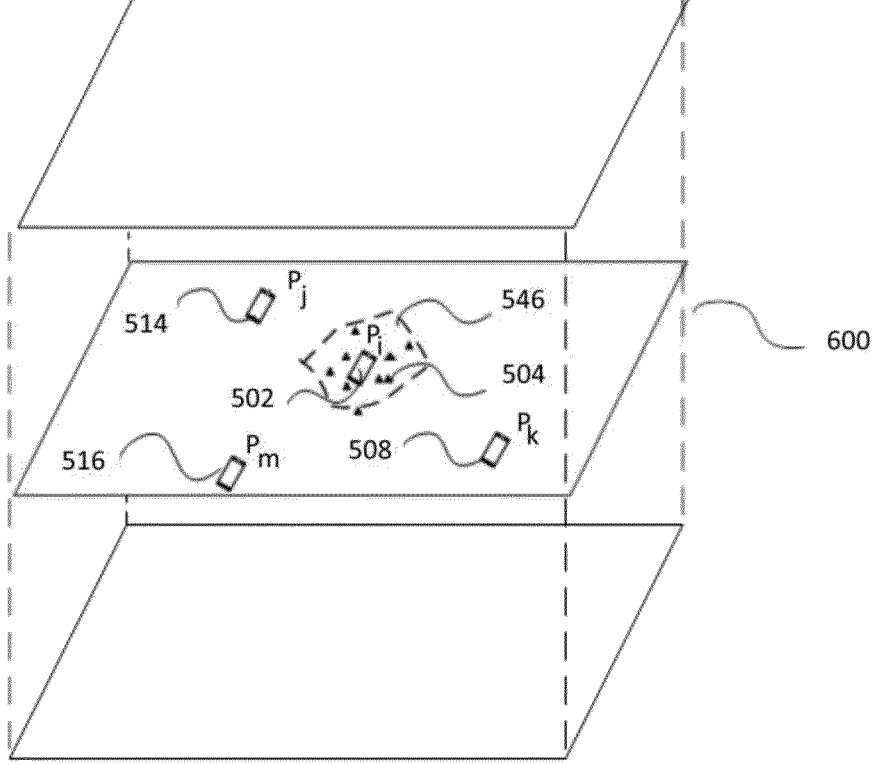

However, the bottom view of FIG. 6b shows an example of initialization of positioning for portable device $P_i$ (502) in the same venue 600 using collaboration similar to the example of FIG. 5b when three neighbor portable devices $P_j$ (514), $P_k$ (508), and $P_m$ (516) additionally provide floor number $$f_t^j$$

in their collaborative data 436. Due to their assistance, the initialization area can be narrowed by sampling the particles 504 in area 546 (encircled by the dashed line), a determination that can be made as described in the example for FIG. 5b, in just one floor (the second floor in the embodiment shown in FIG. 6b). As a result, the convergence time from initialization to tracking and required computing power may be significantly reduced because of the fewer number of particles 504 needed to cover initialization area 546 as compared with the initialization in the whole venue 600 of FIG. 6a.

4. Use of Collaborative Data as Assistance for Reacquisition

Figure 7:
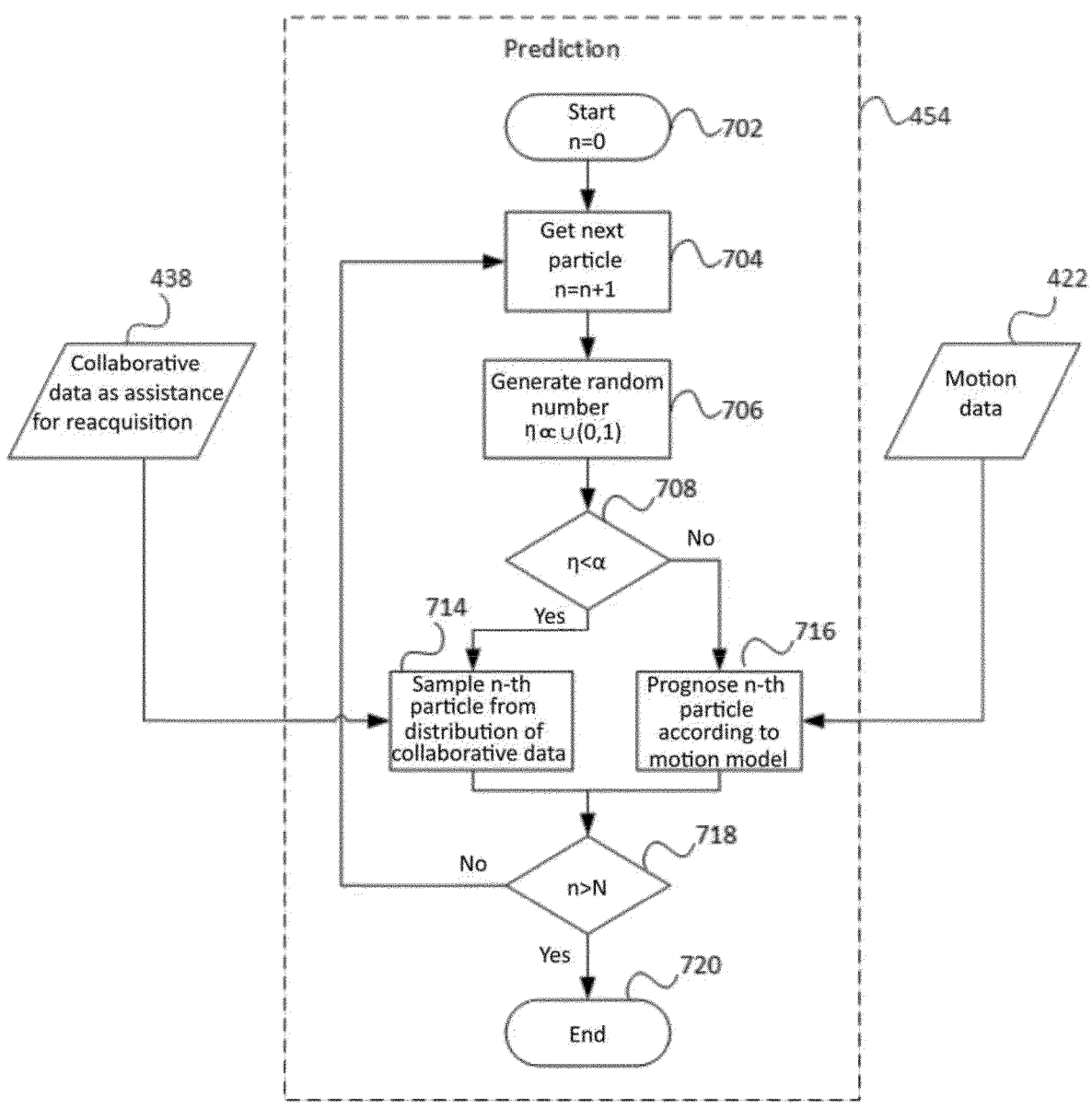
FIG. 7 is a schematic representation of the prediction phase of a state estimation technique used for reacquisition of position tracking according to an embodiment.

As discussed above, reacquisition refers to the process of recovering tracking after it has been lost, for example, because of motion sensor error. Another possible reason of loss of tracking is wrong floor detection in a multi-floor venue that may happen, for example, because of noise of a pressure sensor (barometer), which in many cases is used for floor determination. Using the particle filter embodiment discussed above with regard to FIG. 4 as context, FIG. 7 schematically depicts an embodiment of prediction module 454 suitable for providing collaborative assistance for reacquisition to the particle filter during the prediction stage. The routine shown represents operations of the prediction module during one iteration of the particle filter. The prediction module 454 uses motion data 422 and collaborative data 438 as inputs. Several submodules serve for organizing a cycle over all N particles: submodule 702 initializes the cycle, submodule 704 increments the particle number and gets the next particle for processing, submodule 718 checks condition of cycle completion, and submodule 720 finishes the cycle.

Submodule 706 generates a random number 77 uniformly distributed from 0 to 1. Submodule 708 checks if the random number 77 is less than the predetermined threshold a, which is within a range between 0 and 1. If $\eta < \alpha$, then submodule 714 will substitute the n-th particle with a new one generated from a distribution of the collaborative data 438. Otherwise, i.e., if $\eta > \alpha$, the n-th particle is propagated in submodule 716 according to a motion model and using motion data 422. Thus, with probability $\alpha$, the n-th particle is generated from the collaborative distribution, and, with probability $1-\alpha$, the n-th particle is propagated according to the motion model. After completion of the cycle for all N particles, approximately $\alpha N$ of them will be generated from the distribution of the collaborative data and the rest, approximately $(1-\alpha)N$ particles, will be propagated according to the motion model.

Turning to submodule 716, its function is to propagate the chosen particles. The prediction module propagates coordinates of the particles according to the motion model and using motion data 422 of the portable device. For example, the propagation equations in 2D case can be determined using Equations (8)-(10), where $$\Delta\theta_t^n \propto N(\Delta\theta_t, \sigma_{\Delta\theta t}^2); \Delta D_t^n \propto N(\Delta D_t, \sigma_{\Delta Dt}^2),$$

n=1, . . . , N; $\Delta\theta_t$ and $\Delta\theta_t$ are the heading and the distance changes respectively for the time interval between two consecutive timestamps; $\sigma_{A\theta t}$ and $\sigma_{\Delta Dt}$ are standard deviations of the heading change and the distance change respectively and $N(a,\sigma^2)$ is Gaussian PDF with mean a and dispersion $\sigma^2$.

$$\theta_t^n = \theta_{t-1}^n + \Delta\theta_t^n \tag{8}$$

$$x_t^n = x_{t-1}^n + \Delta D_t^n \cdot \cos(\theta_t^n) \tag{9}$$

$$y_t^n = y_{t-1}^n + \Delta D_t^n \cdot \sin(\theta_t^n) \tag{10}$$

The heading and the distance changes $\Delta\theta_t$ and $\Delta\theta_t$ are obtained from the portable device motion data that are input to the particle filter. For example, the heading change can be obtained from the gyroscope measurements. In pedestrian navigation applications, the distance change can be considered as step length that is estimated by pedestrian dead reckoning (PDR) from accelerometer data, whereas in vehicle navigation the distance change can be obtained from odometry like a wheel sensor or from another type of the velocity sensor.

The techniques can be extended to 3D position tracking by supplementing Equations (8)-(10) with a height change model, such as represented by Equation (11), where $$\Delta h_t^n \propto N(\Delta h_t, \sigma_{\Delta ht}^2); \Delta h_t$$

is height change between two consecutive timestamps which can be determined from pressure sensor (barometer) measurements:

$$h_t^n = h_{t-1}^n + \Delta h_t^n \tag{11}$$

Generation of a portion of the particles from the distribution of the collaborative data in submodule 714 can be similar to generation of particles in initialization stage described above. The difference is that all N particles were sampled for initialization in module 452 (as shown in FIG. 4) for the start of position tracking, whereas only a proportion $\alpha$ of them need be sampled for reacquisition, with determination of parameter $\alpha$ discussed in the context of the illustration of loss of tracking shown in FIG. 8a and the reacquisition of tracking shown in FIG. 8b.

Figure 8A:
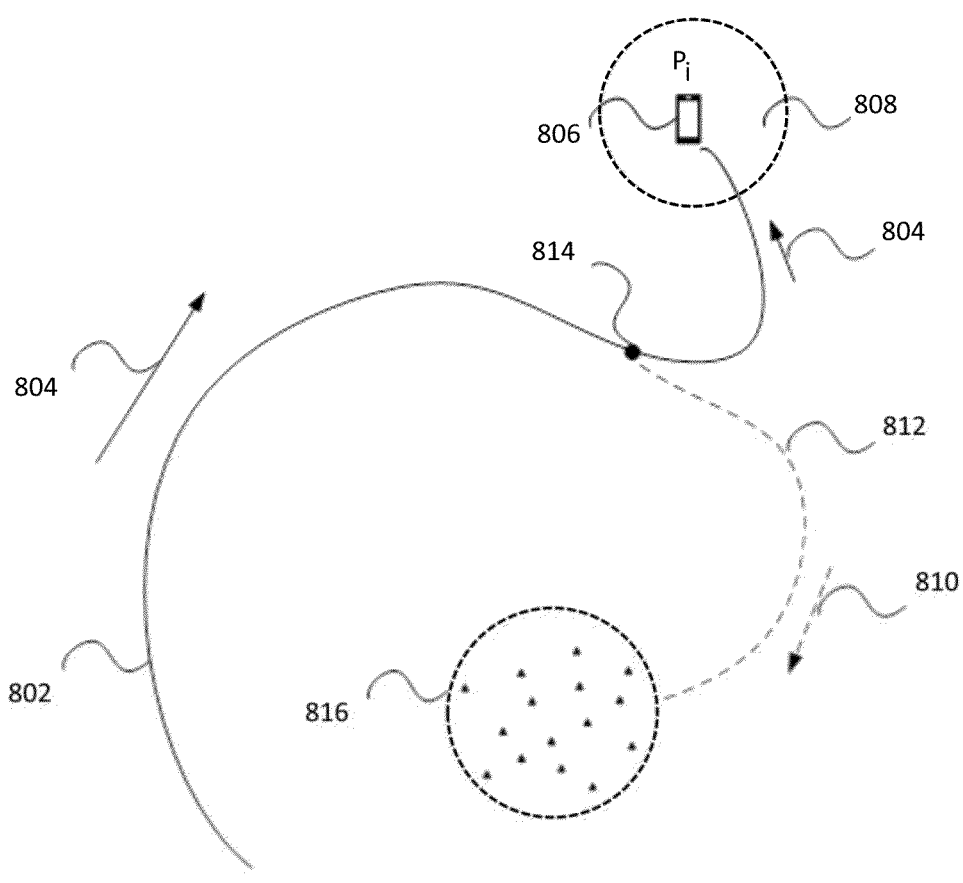
FIGS. 8*a* and 8*b* are schematic diagrams comparing reacquisition of position tracking without (FIG. 8*a*) and with (FIG. 8*b*) collaborative assistance data according to an embodiment.

First, FIG. 8a shows a true trajectory 802 (solid line) of the portable device $P_i$ (806) moving in true direction 804. When the portable device $P_i$ was in location 814 (a black circle), an error in the sensor-based motion data occurred (for example), and tracking was pushed by the motion model to wrong trajectory 812 (dashed line) with incorrect direction 810. The corresponding cloud of particles 816 appeared to be far from the true location of the portable device $P_i$ and there were no particles in the area 808 around the portable device. As such, there was no possibility to correctly update particle weights by measurements taking in the true location of the portable device $P_i$ (806) and thus tracking has been lost. The chance of this situation happening is increased in embodiments in which the number of particles has been limited to reduce the computation burden. In such cases, the available number of particles does not always cover area 808.

Figure 8B:
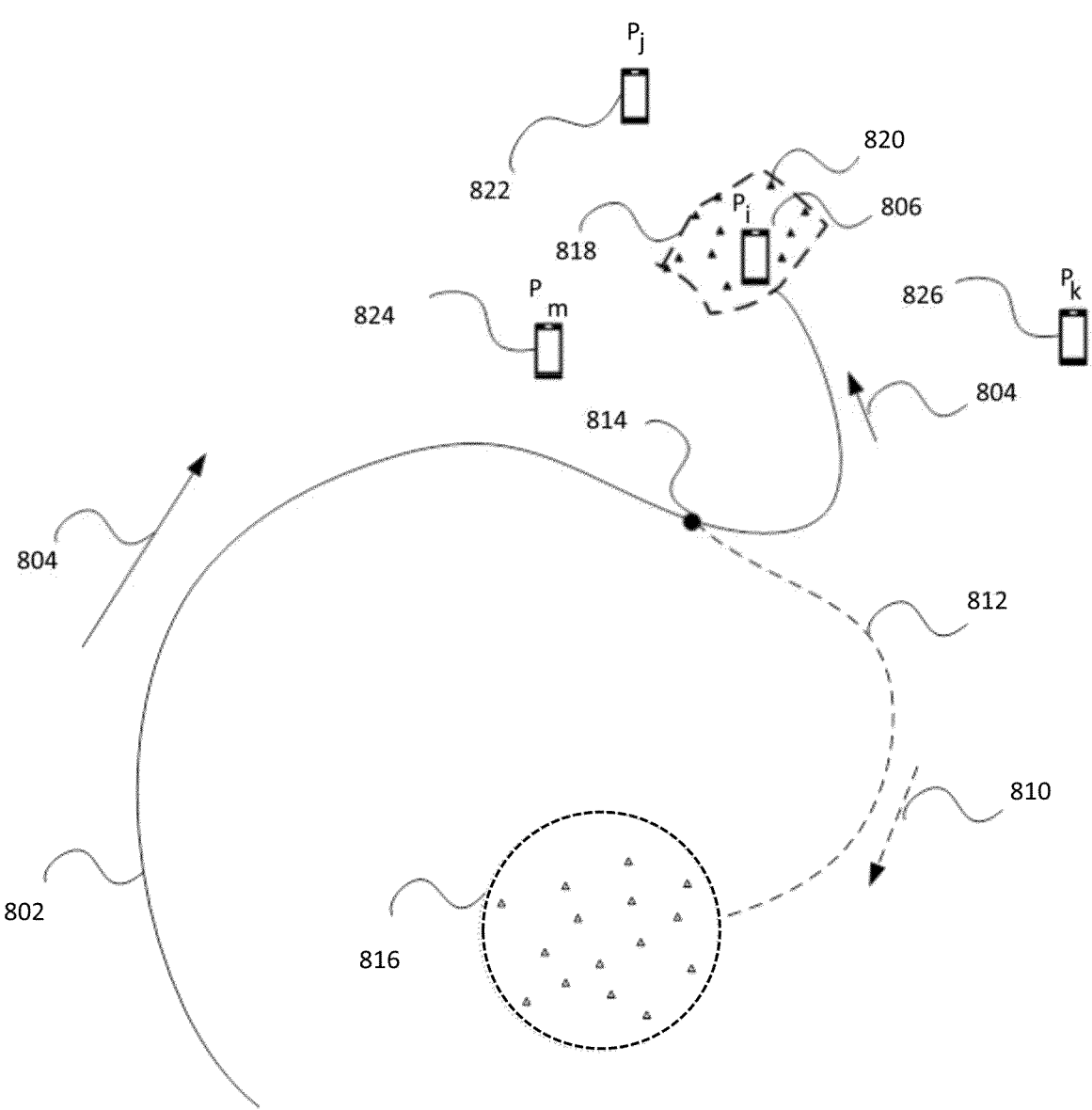

Consequently, FIG. 8b demonstrates a reacquisition of tracking enabled by the presence of neighbor portable devices $P_j$ (822), $P_m$ (824), and $P_k$ (826) in the vicinity of the portable device $P_i$ (806). The portable devices have measured relative distances between each other, communicated with each other, and exchanged information about their states as discussed above. Collaborative data 438 in this example can be the same as data 436 described above for initialization case. The embodiment of FIG. 8b illustrates collaborative assistance by three neighbor devices, similar to the example of FIG. 5b, however, it should be appreciated that other embodiments can employ 3D positioning consistent with the multi-floor venue illustrated by FIG. 6b when being used for reacquisition. According to the discussion of FIG. 7, a proportion $\alpha$ of N particles 820 close to true position of the portable device $P_i$ was sampled in the area 818 that can be determined as was explained for the example of FIG. 5b. A cloud of newly generated particles 820 is encircled by dashed line 818 in FIG. 8b. Given this situation, particles weights inside area 818 can be correctly updated by measurements taking in the true location of the portable device $P_i$, and the particles inside area 818 are given higher weights (shown by filled black triangles) than the particles in area 816 (shown by unfilled triangles) where tracking was lost. Due to resampling in module 460 (as discussed with regard to FIG. 4), particles with lower weights in area 816 are eliminated whereas particles with higher weights in area 818 around true location of portable device $P_i$ are cloned so that the tracking can be recovered. FIG. 8*b* demonstrates assistance for reacquisition of three neighbor portable devices, however, as in the case of initialization, this approach can be generalized for any number of neighbor portable devices.

According to other embodiments, collaborative assistance for reacquisition may be implemented in different ways. For example, collaborative assistance can be applied constantly by sampling in submodule 714 a small part of particles from collaborative distribution, e.g., with a from 0.01 to 0.05. Alternatively, the sampling of particles in submodule 714 can be performed only when a loss of tracking is detected. Detecting loss of tracking for portable device $P_i$, that can be achieved using any one or combination of the following techniques. In a first approach, only data of portable device $P_i$ is used and can be based on comparison of position uncertainty estimated according to Equation (4) with a threshold. If the position uncertainty exceeds the threshold, it may be concluded that the tracking is lost. In another approach, data from several neighbor portable devices is used for detection of loss of tracking and can be based on comparison of predicted and measured relative observations. For example, in case of 2D positioning, one possible way is to compare measured relative distance $$d_t^{ji}$$

between portable devices j and i with the distance $$r_t^{ji}$$

computed according to Equation (1). If relative distances are unavailable because they have not been measured, $$r_t^{ji}$$

may be compared with the maximum detectable distance $d_{max}$. Equation (12) represents one suitable computation for comparing absolute differences to thresholds:

$$\Delta d_{ji} = \left| r_t^{ji} - d_t^{ji} \right| \tag{12}$$

The thresholds can be either fixed or variable depending on the uncertainties of positions and relative measurements and used to decide if tracking was lost or not. For example, if the absolute differences $\Delta d_{ji}$ are less than thresholds for most part of j=1, . . . , $K_t$, i≠j, it may be concluded that the tracking of the portable device i is reliable. In another example, if absolute differences $\Delta d_{ji}$ are bigger than the thresholds for most part of j=1, . . . , $K_t$, i≠j, it can be determined that the tracking of the portable device i could have been lost and that it is desirable to apply collaborative assistance to recover the tracking. Measured relative bearing $$b_t^{ji}$$

with the angle $$\beta_t^{ji}$$

can also be compared between two neighbor portable devices, as computed according to Equation (2), for example, and adding angle difference thresholds for detection of loss of tracking in similar manner as described above for absolute distance differences.

The parameter proportion α of the particles sampled from the collaborative distribution in submodule 714 mode can, for example, depend on at least one or any combination of suitable conditions. In one aspect, uncertainty of position of portable device $P_i$ can estimated, according to Equation (4) for example, with greater uncertainty directly related to the value of proportion α. Alternatively or in addition, when several neighbor portable devices ($K_t$>2) are present, proportion α can be determined based on reliability of tracking of portable device $P_i$. Reliability of tracking can be estimated as a relative number of differences such as determined using Equation (12) that are less than the threshold. For example, when there is low tracking reliability, such as when almost all the differences are bigger than the threshold, or/and a sufficiently large position uncertainty has been determined, proportion α can be relatively large, for example, 0.9. In another example of a medium tracking reliability, e.g., when about half of differences exceed the threshold, or/and a moderate position uncertainty exists, e.g., a few meters, proportion α can be less, 0.1 for example. It should be appreciated these values are given as illustrations only and should not be considered limiting. Moreover, the above discussion regarding sampling particles from area 818 can be applied as well when considering uncertainty.

5. Use of Collaborative Data as Assistance for Tracking

As discussed above, tracking a portable device may involve correcting for motion data errors to provide more continuous position determination as a function of time. Tracking algorithms are usually based on a state estimation technique like Kalman, extended Kalman, Gaussian sum, unscented, or particle filtering. The following discussion demonstrates collaborative data assistance for magnetic-based positioning that improves tracking accuracy in a particle filter embodiment. The assistance of collaborative data can be provided in the update stage of PF as schematically depicted by FIG. 9, which shows an embodiment with regard to an implementation of the update module 456 of FIG. 4.

Figure 9:
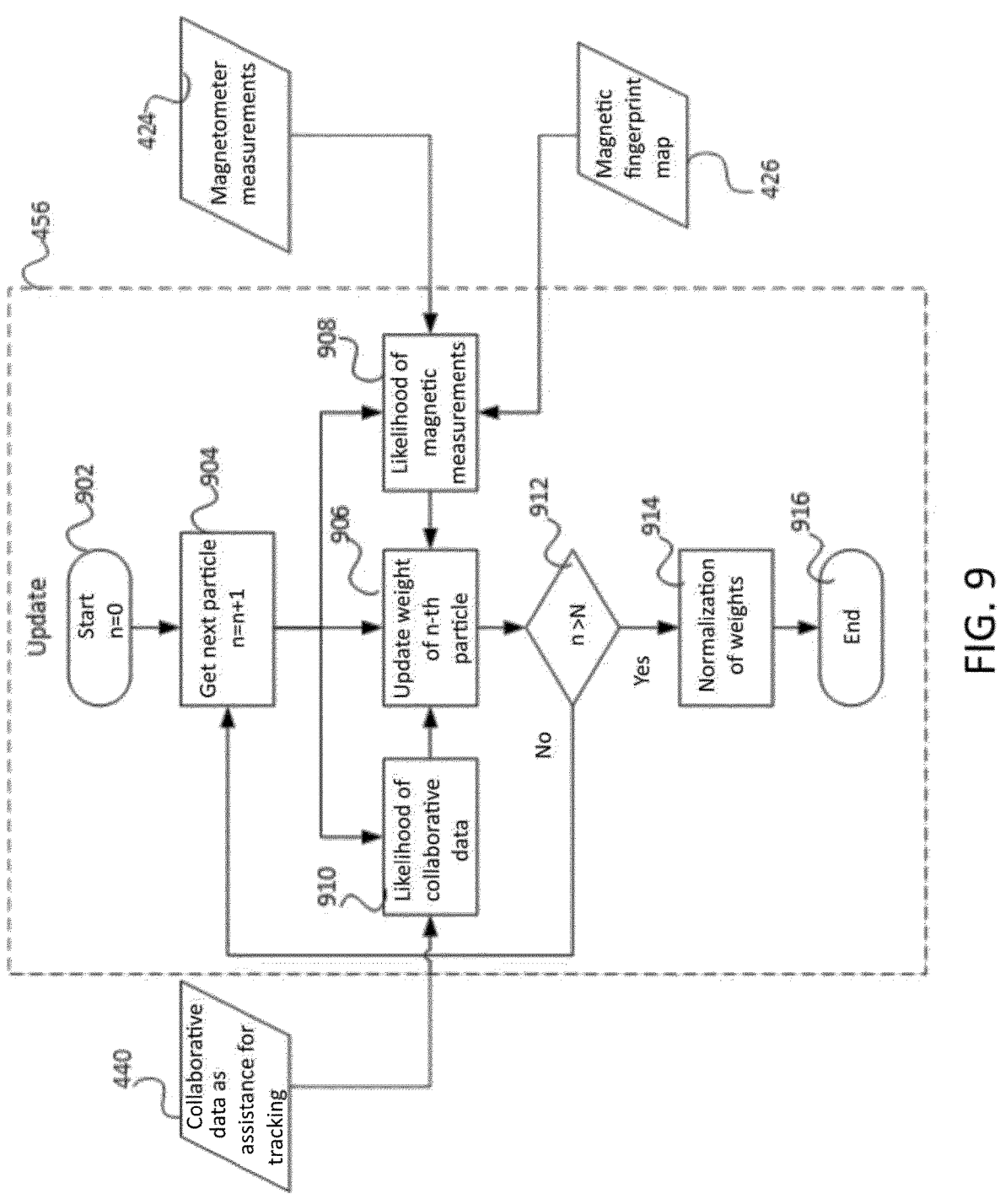
FIG. 9 is schematic diagram of the update phase of a state estimation technique used for maintaining position tracking according to an embodiment.

Correspondingly, FIG. 9 indicates operations of update module 456 in one iteration of the particle filter. The update module 456 uses magnetometer measurements 424, magnetic fingerprint map 426, and collaborative data 440 as inputs. Collaborative assistance data 440 can include state estimation of neighbor portable devices and relative measurements of them. Several submodules serve for organizing a cycle over all N particles: submodule 902 initializes the cycle, submodule 904 increments the particle number and gets next particle for processing, submodule 912 checks condition of cycle completion, and submodule 916 finishes the cycle. The update module 456 updates particle weights using a likelihood function for the measurement model. The likelihood function of magnetometer measurements $$p(\vec{m}_t \mid x_t^n, y_t^n, \theta_t^n)$$

can be assessed in submodule 908 as the probability of observing the magnetometer measurement $\vec{m}_t$ given the state of a particle $$(x_t^n, y_t^n, \theta_t^n).$$

The probability can be evaluated using some 3D distribution, for example multivariate normal or Student distribution. More generally, the measurement model for magnetometer measurements can be expressed as Equation (13), where $\vec{m}_t$ is 3D magnetometer measurement; R is 3×3 rotation matrix, which rotates from the coordinate frame of the magnetic fingerprint map to a coordinate system of the magnetometer (body frame); the rotation matrix depends on heading $\theta_t$, roll $\varphi_t$, and pitch $\theta_t$ angles of a magnetic sensor; M is a 3D magnetic fingerprint map; and $$\vec{\xi}_t^m$$

is magnetometer noise (3D vector) with zero mean and covariance $$\sigma_m^2 I_3 :$$

$$\vec{m}_t = R(\theta_t, \varphi_t, \psi_t)\vec{M}(x_t, y_t, h_t) + \vec{\xi}_t^m \qquad (13)$$

In some situations, general relationship of Equation (13) can be simplified. For example, in case of 2D navigation, magnetic fingerprint map $\vec{M}(x_t, y_t)$ can depend only on planar coordinates $x_t, y_t$. In another case of 2D positioning of a ground vehicle or a portable robot, rotation matrix $R(\theta_t)$ can depend only on heading $\theta_t$.

Submodule (910) evaluates a likelihood function $$p_c(\vec{a}_t \mid x_t^n, y_t^n, \theta_t^n)$$

of relative measurements, where $\vec{a}_t$ is a vector containing relative measurements data from neighbor portable devices such as relative distances and bearings. Given that the relative measurements for the different neighbor portable devices are independent, the likelihood function of relative measurements can be expressed as a product of the likelihood functions for every neighbor portable device according to Equation (14), where $$p_c^j(\vec{a}_t^j \mid x_t^{ni}, y_t^{ni}, \theta_t^{ni})$$

is the likelihood functions of relative measurements for portable device $$j; \vec{a}_t^j$$

is a vector of relative measurements for portable device j, j=1, . . . , $K_t$, i≠j; and $K_t$ is number of portable devices:

$$p_c(\vec{a}_t \mid x_t^{ni}, y_t^{ni}, \theta_t^{ni}) = \prod_{\substack{j=1 \\ j \ne i}}^{K_t} p_c^j(\vec{a}_t^j \mid x_t^{ni}, y_t^{ni}, \theta_t^{ni}) \qquad (14)$$

Different embodiments can involve the likelihood of relative measurements. For example, when several neighbor portable devices can measure relative distances between them and portable device i, $$\vec{a}_t^j$$

contains only measured relative distance $$d_t^{ji}$$

between neighbor portable device j and portable device i and the likelihood function has a simpler form without dependency on heading. This can be derived from Equation (1) and expressed according to the following measurement model for the relative distance of Equation (15), where $$x_t^i, y_t^i$$

are coordinates of position estimate of the portable device i;

$$x_t^j, y_t^j$$

are coordinates of position estimate of the neighbor portable device j; and $$\xi_t^d$$

is a relative distance measurement error that can be considered as a normal random variable with zero mean and standard deviation $$\sigma_{dt}^{ji}:$$

$$d_t^{ji} = \sqrt{\left(x_t^j - x_t^i\right)^2 + \left(y_t^j - y_t^i\right)^2} + \xi_t^d \qquad (15)$$

Suitable forms of likelihood functions $$p_c^j\left(d_t^{ji} \mid x_t^{ni}, y_t^{ni}\right)$$

that assess the probability of observing the relative distance $$d_t^{ji}$$

given the coordinates of a particle $$(x_t^n, y_t^n),$$

are possible for different types of estimation of the state in portable device j. In one embodiment, when accurate state estimation by portable device j can be characterized by a small position uncertainty, the posterior distribution can be taken as unimodal, such as a normal distribution for example, and it may be sufficient to represent the state estimation by its mean and uncertainty as was explained earlier. This allows portable device j to send to portable device i only the mean position estimated, for example, according to Equation (3) and position uncertainty estimated according to Equation (4), requiring less bandwidth of the communication channel between the two portable devices. It can be shown that assuming small uncertainties of the relative distance and the position, the likelihood function of the relative distance measured between portable device j and portable device i can be evaluated according to Equation (16), where $$x_t^{ni}, y_t^{ni}$$

are coordinates of particles of the portable device i, n=1, . . . , N; upper index i was added to emphasize affiliation of the particles with the portable device i;

$$x_t^j, y_t^j$$

are coordinates of position estimate of the neighbor portable device j=1, . . . , $K_t$, j≠i;

$$d_t^{ji}$$

is the relative distance measured between neighbor portable device j and portable device i;

$$\sigma_{st}^j$$

is the standard deviation of position of neighbor portable device j;

$$\sigma_{dt}^{ji}$$

is the standard deviation of the relative distance between neighbor portable device j and portable device i; and C is a normalization factor:

$$p_c^j\left(d_t^{ji} \mid x_t^{ni}, y_t^{ni}\right) = C \cdot \exp\left\{-\frac{1}{2} \cdot \frac{\left(d_t^{ji} - \sqrt{\left(x_t^j - x_t^{ni}\right)^2 + \left(y_t^j - y_t^{ni}\right)^2}\right)^2}{\left(\sigma_{dt}^{ji}\right)^2 + \left(\sigma_{st}^j\right)^2}\right\} \qquad (16)$$

In embodiments involving less accurate state estimation in portable device j characterized by a multimodal posterior distribution of the state, the full description of the state of the portable device j can be provided by its particles set $$\left(x_t^{lj}, y_t^{lj}, \theta_t^{lj}\right)$$

with corresponding weights $$w_t^{lj},$$

l=1, . . . , $L_j$, which represents the posterior distribution of the state. The likelihood function of the relative distance measured between portable device j and portable device i can then be evaluated according to Equation (17), where $$x_t^{ni}, y_t^{ni}$$

are coordinates of particle n affiliated with the portable device i, n=1, . . . , N;

$$x_t^{lj}, y_t^{lj}$$

are coordinates of particle l affiliated with the neighbor portable device j, l=1, . . . , $L_j$;

$$w_t^{lj}$$

US 12,618,675 B2

41 are weights of particles affiliated with the neighbor portable device j, l=1, . . . , $L_j$; $L_j$ is a number of particles affiliated with the portable device j;

$$\sigma_{dt}^{ji}$$

is the standard deviation of the relative distance measured between neighbor portable device j and portable device i; and C is a normalization factor:

$$p_c(d_t^{ji} \mid x_t^{ni}, y_t^{ni}) = C \cdot \sum_{l=1}^{L_j} w_t^{lj} \exp\left\{-\frac{\left(d_t^{ji} - \sqrt{(x_t^{lj} - x_t^{ni})^2 + (y_t^{lj} - y_t^{ni})^2}\right)^2}{2(\sigma_{dt}^j)^2}\right\} \quad (17)$$

In addition to relative distance, the likelihood function of relative measurements in submodule 910 can also account for relative bearing measurements (if they are available) according to a measurement model that can be derived from Equation (2). For example, Equation (18) uses such relative bearing measurements, where $$\theta_t^i$$

is heading of portable device i;

$$\xi_t^b$$

is relative bearing measurement error that can be considered as a normal random variable with zero mean and standard deviation $$\sigma_{bt}^{ij}:$$

$$b_t^{ij} = a\tan2(y_t^j - y_t^i, x_t^j - x_t^i) - \theta_t^i + \xi_t^b \quad (18)$$

Similarly, formulas for likelihood evaluation for a measurement model according Equation (18) can be derived in a similar manner to that described for Equations (16) and (17).

Submodule 906 provides fusion of magnetic field measurements and collaborative data by updating particle weights $$w_t^n,$$

n=1, . . . , N, using two likelihood functions: the likelihood function of magnetic measurements $$p_m(\vec{m}_t \mid x_t^n, y_t^n, \theta_t^n)$$

42 from submodule 908 and the likelihood function of collaborative data $$p_c(\vec{d}_t \mid x_t^n, y_t^n, \theta_t^n)$$

from submodule 910 determined according to Equations (16) or (17). Since magnetic and collaborative data are independent, particle weights can be updated in submodule 906 by using a product of two likelihood functions as expressed in Equation (19):

$$w_t^n = w_{t-1}^n \cdot p_m(\vec{m}_t \mid x_t^n, y_t^n, \theta_t^n) \cdot p_c(\vec{d}_t \mid x_t^n, y_t^n, \theta_t^n) \quad (19)$$

After particles are updated, their weights are normalized in submodule 914, so that the sum of their weights equals to one. Due to this operation, there is no need for determination of normalization factor C such as used in Equations (16) and (17).

During the tracking operations discussed above, there may be a need to compensate for biases in the magnetometer measurements caused by hard- and soft-iron distortions of the environment. The techniques of this disclosure allow the compensation of magnetometer bias to be performed simultaneously with the determination of portable device position, such as through use of a Rao-Blackwellized (AKA marginalized) particle filter (RBPF) as discussed below. It will also be appreciated that position estimations during tracking can be augmented by fusion with other techniques, including without limitation map matching, radio fingerprinting, proximity-based positioning and/or optical-based positioning as well as others as also discussed below.

6. Further Examples a. Estimation of the State of Neighbor Portable Devices

Estimating the state of neighbor portable devices may employ a mean and an uncertainty representing a unimodal posterior distribution of the state. Alternatively, the states may be estimated with a set of particles with corresponding weights representing an arbitrary posterior distribution of the state b. Exchange of State Information According to the techniques of this disclosure, portable devices collaboratively exchange their state estimations with each other. If the posterior distribution of the state is unimodal, it is enough to send only the mean and uncertainty. However, to represent multimodal posterior distribution, sending of all particles with corresponding weights can be necessary. Transmission of all particles from portable device j to portable device i can require a wide-band communication channel between the two portable devices. Notably, processing of these particles according to Equation (17) can require increased computations in the portable device i compared with more economical computation according to Equation (16). In some embodiments, a more economical solution can be achieved by combining both approaches. If, in some time instance, the state posterior distribution is unimodal and represented by a mean and an uncertainty, e.g., a covariance, neighbor portable device j can send to portable devices i only the mean and the uncertainty. The likelihood function of the relative measurement is evaluated in portable device i according to Equation (16). Otherwise, i.e., if the state posterior distribution is multimodal, the state of portable device j is represented by the whole set of particles with corresponding weights; portable device j sends all the particles and the weights to portable device i, and the likelihood function is evaluated in portable device i according to Eq. (17). As a result, portable devices may send the mean and the uncertainty if the posterior distribution is unimodal or the entire set of the particles otherwise when exchanging the state estimation to conserve communication bandwidth.

c. Determining Whether the Posterior Distribution is Unimodal

Any suitable means for determining whether the state posterior distribution is unimodal or not can be employed. For example, a solution can be based on an uncertainty estimated according to Equation (4). If the uncertainty small, e.g., less than a suitable threshold such as less than 1 or 2 m, it may be decided that the state posterior distribution is most likely unimodal. A more complicated but more accurate method can be based on a cluster analysis of a cloud of the particles. If more than one cluster has been found, it can be decided that the state posterior distribution is multimodal. Both approaches can be combined as desired.

d. Relative Observations

As discussed above, relative observations may be employed for collaborative assistance. Relative observations may be any one or combination of relative distance and relative direction, such as relative bearing.

e. Selection of Neighbor Portable Devices for Collaborative Positioning

A preliminary selection of the neighbor portable devices for collaborative positioning may be performed by using any one or a combination of the criteria explained above. Suitable criteria include using data of a neighbor portable device with the latest timestamp (most recent data); using the data of the portable device that in clear line-of-sight conditions; using data from the stationary neighbor portable devices; using data of a neighbor portable device with the smallest position uncertainty; using data of a neighbor portable device with the smallest uncertainty of relative measurements; using portable devices selected by a criterion of a lower dilution of precision (DOP) value.

f. Propagation of Collaborative Data

Collaborative data may be propagated or predicted at the time of position determination to mitigate aging of the data caused by latency of data delivery as explained above, such as by extrapolation.

g. Using a Particle Filter for Magnetic-Based Collaborative Positioning

In some embodiments, the magnetic-based collaborative positioning according to the techniques of this disclosure may employ a particle filter, such as discussed with regard to FIG. 4.

h. Using a Rao-Blackwellized Particle Filter for Magnetic-Based Collaborative Positioning There may be a need to compensate for biases in the magnetometer measurements caused by hard- and soft-iron distortions of the environment. The techniques of this disclosure allow the compensation of magnetometer bias to be performed simultaneously with the determination of portable device position. Advantageously, the simultaneous magnetometer calibration and position determination does not require magnetometer manual recalibration even if the magnetometer bias has changed. The following discussion is provided in the context of using a Rao-Blackwellized (AKA marginalized) particle filter (RBPF), but any equivalent state estimation technique may be used as desired. Suitable details according to one implementation may be found in co-pending, commonly-owned U.S. patent application Ser.

No. 17/082,490, filed Oct. 28, 2020, which is hereby-incorporated by reference in its entirety.

Similar to PF, inputs to the RBPF include magnetometer measurements, the magnetic fingerprint map, and the derived vehicle motion parameters. As known in the art, an RBPF is characterized by a state vector that is divided into two parts: a non-linear state and a linear state, with both the motion and measurement models linear in the linear state. The first, non-linear state is estimated by the particle filter (PF) and the second, linear state is estimated by the Kalman filter (KF). This approach allows a reduction in dimension of the more computationally intensive non-linear part, i.e., in the PF.

The following discussion involves one exemplary implementation of an RBPF. The linear state may be expressed as a 3D magnetometer bias vector $\vec{b}$ because the bias linearly depends on magnetometer readings and the magnetic fingerprint. As for the non-linear state of a portable device, it can comprise 2D position $x_t, y_t$ and a heading $\theta_t$, whereas for 3D case, the non-linear state additionally comprises an altitude (or a height) ht. For example, the motion model for the non-linear state is given by the equations detailed above. For the linear state, it may be considered that the magnetometer bias almost does not vary, allowing the measurement model to be expressed as Equation (20), in which $\vec{m}_t$ is 3D magnetometer measurement, R is 3×3 rotation matrix, which rotates from the fingerprint frame into the body frame, M is 3D magnetic fingerprint map, $\vec{b}$ is 3D magnetometer bias, and $$\vec{\xi}_t^m$$

is magnetometer noise (3D vector) with zero mean and covariance $$\sigma_m^2 I_3 :$$

$$\vec{m}_t = R(\theta_t, \varphi_t, \psi_t)\vec{M}(x_t, y_t) + \vec{b} + \vec{\xi}_t^m \tag{20}$$

Each of N particles may be considered as a pair of Cartesian coordinates and heading $$(x_t^i, y_t^i, \theta_t^i),$$

i=1, ..., N, N is the number of particles and t is a time index. Each particle also contains a magnetometer bias $$\vec{b}_t^i$$

as a 3D vector. Each particle is assigned with a weight $$w_t^i,$$

depending upon probability density value of this state.

This RBFP algorithm combines the prediction, update and resampling stages of PF and the prediction and update stages of KF. First, in the prediction stage, the non-linear particle state is propagated in the PF using motion parameters and a motion model, such as described above. As the magnetometer bias vector is almost constant, some small normal random 3D number can be added for every particle to cover a bias uncertainty. A covariance of the KF can be propagated using known equations for KF. Next, in the update stage of the PF, particle weights $$w_t^i,$$

i=1, . . . , N, are updated using a likelihood function for the measurement model of Equation (20). The likelihood function in this example is the probability of observing the magnetometer measurement given the state of a particle. The probability can be evaluated using an appropriate 3D distribution, for example multivariate normal or Student distribution. The particle weights are also normalized so that their sum equals to one. Then, in the update stage of the KF, the linear state of the particles and the covariance are updated. Collaborative assistance can be applied in the update stage of the RBPF in accordance with Equation (19), modified in that the likelihood of magnetic measurements corresponds to measurement model of Equation (20) instead of Equation (13).

i. Collaborative Assistance for Start

Collaborative assistance for the start of tracking position of a portable device is applied in an initialization step of the particle filter by narrowing the area of initialization.

j. Collaborative Assistance for Reacquisition

Collaborative assistance for reacquisition is applied in prediction step of the particle filter by sampling a part of particles, which are selected randomly, from the distribution of the collaborative data whereas remaining particles are propagated according to the motion model.

k. Collaborative Assistance for Tracking

Collaborative assistance for tracking is applied in the update step of the particle filter by fusion of magnetic and collaborative data for update of weights of the particles.

l. Sampling of Particles

A proportion of the particles may be sampled from the distribution of the collaborative data in reacquisition mode. This can include sampling the particles constantly or sampling the particles after detection of loss of tracking.

m. Determining a Proportion of the Particles for Sampling

As noted above, the proportion of the particles sampled from the distribution of the collaborative data in reacquisition mode depends on at least one or a combination of conditions including uncertainty of position and reliability of tracking.

n. Fusion with Other Techniques

Position determination can be further improved by fusion of the magnetic-based collaborative positioning with one or more additional positioning technologies upon their availability. Suitable examples include, without limitation, map matching; radio fingerprint-based positioning like Wi-Fi and BLE fingerprint-based positioning; proximity-based positioning with devices like RFID tags and BLE beacons; and optical-based positioning like camera-based and VLC-based positioning. Portable devices used when practicing the techniques of this disclosure may include the components necessary for the respective technologies, such as a wireless module for the protocol involved, a camera or other optical sensor, etc. One exemplary embodiment may involve fusion of magnetic positioning with one or several technologies using the following operations. Necessary supporting data, like a venue plan, Wi-Fi or BLE fingerprint maps, location of proximity beacons or RFID tags, location of optical landmarks, etc., may be obtained from a server. Measurements related to the additional positioning technologies may then be obtained. For example, in case of radio fingerprint-based positioning, a set of Wi-Fi or BLE RSSI measurements from in-range Wi-Fi access points or BLE beacons at a current location of the vehicle can be obtained. A likelihood function may be computed based on measurements of the additional positioning method. Due to independence of measurements for different positioning methods, the likelihood can be considered as a product of likelihoods of measurements for these methods, for example, a product of the likelihood for magnetometer measurements with a likelihood for Wi-Fi RSSI measurements. Correspondingly, particle weights may be updated in the update stage of PF using the product of the likelihoods. As another illustration in the context of map matching, the purpose of the map matching algorithm is to refine a route of user by matching the route with the building floor plan. Assuming that a venue plan is available and is stored on the server, the venue plan defines obstacles that cannot be crossed by a vehicle like walls, structures and other untraversable areas, etc. Improvement of trajectory estimation is achieved by checking the permissibility of transition from one position to another one. A possible variant of using the floor venue involves obtaining map information from a server or other source for loading into positioning module 234 for example. A combination of magnetic-based positioning and map matching can be realized based on a particle filter. Each particle of the PF is checked for the permissibility of transitioning from one position to another, using coordinates of the obstacles shown on the venue plan, for example walls. The result of checking is used in the PF during the update stage. If the transition of an i-th particle is not allowed, its weight is set to zero, i.e.

$$w_t^i = 0.$$

Thus, map constraints prevent a position that results from crossing walls, visiting restricted zones or other similar restrictions.

CONTEMPLATED EMBODIMENTS

The present disclosure describes the body frame to be x forward, y positive towards right side of the body and z axis positive downwards. It is contemplated that any body-frame definition can be used for the application of the method and apparatus described herein.

Magnetic-based indoor vehicle positioning can be combined with other positioning techniques depending upon availability for further improvement of positioning accuracy and reliability. The embodiments and techniques described above may be implemented in software as various interconnected functional blocks or distinct software modules. This is not necessary, however, and there may be cases where these functional blocks or modules are equivalently aggregated into a single logic device, program, or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent, or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for magnetic-based collaborative positioning of a portable device, the method comprising:
   a) obtaining Earth's magnetic field measurements from a magnetometer associated with the portable device;
   b) obtaining magnetic fingerprint map information;
   c) obtaining parameters of motion of the portable device;
   d) obtaining with the portable device collaborative assistance data directly from at least one neighbor portable device, wherein the collaborative assistance data comprises a state estimation of the at least one neighbor portable device and at least one of a relative distance between the portable device and the at least one neighbor portable device and a relative direction between the portable device and the at least one neighbor portable device; and
   e) determining position of the portable device with at least one processor of the portable device based on the obtained magnetic field measurements, the obtained magnetic fingerprint map information, the obtained motion parameters, and the obtained collaborative assistance data, wherein determining position of the portable device comprises maintaining position tracking for the portable device and wherein the collaborative assistance data is applied during an update phase of a particle filter.

2. The method of claim 1, wherein determining position of the portable device comprises at least one of:
   a) starting position tracking for the portable device during initialization; and
   b) reacquiring position tracking for the portable device after loss of tracking.

3. The method of claim 2, wherein determining position of the portable device comprises starting position tracking for the portable device during an initialization phase of a particle filter and wherein an initialization area is narrowed based at least in part on the collaborative assistance data.

4. The method of claim 2, wherein determining position of the portable device comprises reacquiring position tracking for the portable device after loss of tracking wherein the collaborative assistance for reacquisition is applied during a prediction step of a particle filter and wherein a proportion of particles are sampled from a distribution of the collaborative assistance data and a remainder of particles are propagated according to a motion model.

5. The method of claim 1, wherein the state estimation of the at least one neighbor portable device comprises a mean position and an uncertainty.

6. The method of claim 1, wherein the state estimation of the at least one neighbor portable device comprises a set of particles with corresponding weights.

7. The method of claim 1, further comprising determining whether a distribution of the state estimation of the at least one neighbor portable device is unimodal.

8. The method of claim 7, wherein the state estimation of the at least one neighbor portable device comprises a mean position and an uncertainty when a distribution of the state is unimodal and comprises a set of particles with corresponding weights when a distribution of the state is multimodal.

9. The method of claim 1, further comprising obtaining collaborative assistance data from a plurality of neighbor portable devices.

10. The method of claim 9, further comprising preliminarily selecting a set of at least one neighbor portable device from the plurality of neighbor portable devices.

11. The method of claim 10, wherein selecting a set of at least one neighbor portable device is based at least in part on any one or any combination of:
   a) recency of data of the neighbor portable devices;
   b) line of sight to the neighbor portable devices;
   c) proximity of the neighbor portable devices;
   d) stationarity of the neighbor portable devices;
   e) uncertainty of position of the neighbor portable devices;
   f) uncertainty of relative measurements of the neighbor portable devices; and
   g) dilution of precision of the neighbor portable devices.

12. The method of claim 1, wherein the obtained collaborative assistance data are propagated to a first instant and wherein the position determined for the portable device is for the first instant.

13. The method of claim 1, wherein the position for the portable device is determined using a state estimation technique that comprises a Kalman filter for estimating a linear state for magnetometer bias and a particle filter for estimating a non-linear state for position of the portable device.

14. The method of claim 1, wherein the determined magnetic-based collaborative positioning is combined with at least one or a combination of:
   i) map-matching;
   ii) radio frequency fingerprinting;
   iii) proximity sensing; and
   iv) an optical technique.

15. A portable device for magnetic-based collaborative positioning, comprising:
   a) a magnetometer outputting Earth's magnetic field measurements for the portable device;
   b) a wireless communication module for obtaining magnetic fingerprint map information;
   c) motion sensors outputting parameters of motion of the portable device;
   d) a wireless communication module for obtaining collaborative assistance data directly from at least one neighbor portable device, wherein the collaborative assistance data comprises a state estimation of the at least one neighbor portable device and at least one of a relative distance between the portable device and the at least one neighbor portable device and a relative direction between the portable device and the at least one neighbor portable device; and
   e) at least one processor configured to:
      i) receive the magnetic field measurements for the portable device, the magnetic fingerprint map information, the motion parameters of the portable device and the collaborative assistance data; and
      ii) determine position of the portable device based on the received magnetic field measurements, the received magnetic fingerprint map information, the received motion parameters, and the received collaborative assistance data, wherein determining position of the portable device comprises maintaining position tracking for the portable device and wherein the collaborative assistance data is applied during an update phase of a particle filter.

16. The portable device of claim 15, wherein the at least one processor is configured to determine position of the portable device by at least one of:

a) start position tracking for the portable device during initialization;

b) reacquire position tracking for the portable device after loss of tracking; and c) maintain position tracking for the portable device.

17. A system for magnetic-based collaborative positioning, comprising:

a) a server providing magnetic fingerprint map information; and b) a plurality of neighbor portable devices, wherein each portable device comprises:

i) a magnetometer outputting Earth's magnetic field measurements for the portable device;

ii) a wireless communication module for obtaining magnetic fingerprint map information;

iii) motion sensors outputting parameters of motion of the portable device;

iv) a wireless communication module for obtaining collaborative assistance data directly from at least one neighbor portable device, wherein the collaborative assistance data comprises a state estimation of the at least one neighbor portable device and at least one of a relative distance between the portable device and the at least one neighbor portable device and a relative direction between the portable device and the at least one neighbor portable device; and v) at least one processor configured to:

I) receive the magnetic field measurements for the portable device, the magnetic fingerprint map information, the motion parameters of the portable device and the collaborative assistance data; and II) determine position of the portable device based on the received magnetic field measurements, the received magnetic fingerprint map information, the received motion parameters, and the received collaborative assistance data, wherein determining position of the portable device comprises maintaining position tracking for the portable device and wherein the collaborative assistance data is applied during an update phase of a particle filter.

18. The system of claim 17, wherein at least one of the plurality of neighbor portable devices receives collaborative assistance from another of the plurality of neighbor devices by communicating through the server.

19. The system of claim 17, wherein at least one of the plurality of neighbor portable devices receives collaborative assistance data directly from at least one other of the plurality of neighbor devices.

* * * * *